United States Patent
Nguyen et al.

(10) Patent No.: US 9,720,476 B1
(45) Date of Patent: Aug. 1, 2017

(54) AUTOMATIC TRANSFER SWITCH WITH POWER QUALITY MODULE

(71) Applicant: Amazon Technologies, Inc., Seattle, WA (US)

(72) Inventors: Huyen Van Nguyen, Bothell, WA (US); Richard Arvel Stevens, Auburn, WA (US); Hoang Pham, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 147 days.

(21) Appl. No.: 14/657,811

(22) Filed: Mar. 13, 2015

(51) Int. Cl.
  *G06F 11/00* (2006.01)
  *G06F 1/26* (2006.01)
  *G06F 1/28* (2006.01)

(52) U.S. Cl.
  CPC ............... *G06F 1/266* (2013.01); *G06F 1/28* (2013.01)

(58) Field of Classification Search
  CPC . G06F 1/26; G06F 1/263; G06F 1/266; G06F 1/28; G06F 1/30; G06F 1/305; G06F 11/2015
  See application file for complete search history.

(56) References Cited

U.S. PATENT DOCUMENTS

| | | | | |
|---|---|---|---|---|
| 5,883,796 A * | 3/1999 | Cheng | ................... | H02J 3/1814 307/105 |
| 6,876,103 B2 | 4/2005 | Raduseqicz et al. | | |
| 8,924,781 B2 * | 12/2014 | Shaw | ........................ | G06F 1/30 714/14 |
| 2006/0224907 A1 * | 10/2006 | Feldman | .................... | G06F 1/30 713/300 |
| 2008/0258556 A1 * | 10/2008 | Ewing | ........................ | H02J 9/06 307/23 |
| 2010/0169031 A1 * | 7/2010 | Dishman | ................ | G01R 31/40 702/60 |
| 2013/0019124 A1 * | 1/2013 | Grimshaw | .......... | G06F 11/2015 714/24 |

OTHER PUBLICATIONS

"Zenith ZTS Series: Low-Voltage Automatic and Manual Transfer Switches," GE Energy/Digital Energy, 2010, pp. 1-8.
APC by Schneider Electric, "Wall-mount Transfer Switches," downloaded from file:///K:/A/Amazon.com/Amazon10%20(6924)/02300/IDS/Wall-mount%20Universal%20Transfer%20Switch%20(UTS)%20%E2%80%93%20Uninterrupted%20Power%20%20%20APC.html on Mar. 13, 2015, p. 1.
U.S. Appl. No. 13/528,301, filed Jun. 20, 2012, Long X. Nguyen, et al.
U.S. Appl. No. 14/020,499, filed Sep. 6, 2013, Huyen Van Nguyen, et al.

(Continued)

*Primary Examiner* — Michael Maskulinski
(74) *Attorney, Agent, or Firm* — Robert C. Kowert; Meyertons, Hood, Kivlin, Kowert & Goetzel, P.C.

(57) ABSTRACT

An automatic transfer switch (ATS) includes power quality conditioners to condition electrical power fed to a power output of the automatic transfer switch. In some embodiments, the power quality conditioners include a surge protection circuit or a filter circuit. In some embodiments, the automatic transfer switch includes a battery module configured to supply electrical power to the power output of the ATS during a power disruption event.

20 Claims, 15 Drawing Sheets

(56) References Cited

OTHER PUBLICATIONS

U.S. Appl. No. 14/083,384, filed Nov. 18, 2013, Oleg Perevalov, et al.
U.S. Appl. No. 14/181,067, filed Feb. 14, 2014, Brock R. Gardner, et al.
U.S. Appl. No. 14/572,700, filed Dec. 16, 2014, Felipe Enrique Ortega Gutierrez, et al.

* cited by examiner

AUTOMATIC TRANSFER SWITCH WITH POWER QUALITY MODULE

BACKGROUND

Organizations such as on-line retailers, cloud computing providers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110 volts). A network of cabling, bus bars, power connectors, and power distribution units, is used to deliver the power at the lower voltage to numerous specific components in the facility.

In some systems, an automatic transfer switch ("ATS") device provides switching from a primary power system to a secondary (e.g., back-up) power system. In a typical system, the automatic transfer switch automatically switches the computing equipment to the secondary system upon detecting a fault in the primary power. Typical automatic transfer switches may switch from the primary power system to the secondary power system rapidly (e.g. switching may take approximately 12 milliseconds). However, there still may be a short period of time in which power is not being fed from an automatic transfer switch while it is switching from a primary power system to a secondary power system.

In some systems, components in a primary or secondary power system may generate harmonic currents or voltages. In power systems transmitting alternating current (AC) electrical power, the current varies sinusoidally at a specific frequency (e.g. 50 hertz or 60 hertz). Non-linear loads in a power system, such as rectifiers, may draw a current that is non-sinusoidal. This non-sinusoidal current draw may alter the current waveform so that the waveform includes additional frequencies other than the primary frequency (e.g. other than 50 hertz or 60 hertz). Also, upstream components in a power system, such as uninterruptible power supplies (UPS), may create harmonic voltages. For example, an upstream UPS that converts energy stored in a battery (as DC power) into AC current, may create harmonics because the conversion from DC to AC is approximate and varies from an ideal sine wave. In addition, harmonic currents may distort the voltage provided by a voltage source due to source impedance, resulting in harmonic voltages. Electrical equipment, such as computing equipment, receiving electrical power that includes harmonic currents or harmonic voltages may dissipate the harmonic currents or voltages before using the electrical power. Dissipating the harmonic currents or voltages may result in heating of the electrical equipment and may otherwise affect the reliability of the electrical equipment.

In some systems, changes in upstream equipment, such as energizing a transformer, may result in current or voltage surges. Other phenomena, such as lightning strikes or abrupt changes in a system load, may cause current or voltage surges. These current or voltage surges may damage downstream equipment, such as computer equipment. Some data centers, may include surge protectors in upstream components, such as upstream UPSs, to protect downstream equipment from current or voltage surges.

In some systems, upstream components may supply electrical power to a large number of downstream components. A failure in an upstream component, such as a UPS or power distribution unit (PDU), may affect a large number of downstream components, such as a large number of computer systems.

In some systems, current or voltage filtering, surge protection, reserve power storage, waveform monitoring, initiation of backup generators, and power monitoring may be performed by various separate devices spread out throughout a data center. In some systems, redundant devices or services may perform the same functions. Incompatibilities between devices or a lack of communication between devices may result in capabilities of devices not being fully utilized. In some systems, individual devices may be supplied by separate suppliers with separate standards, interfaces, requirements, etc. In some systems, non-commodity components may be required so that separate devices from different suppliers operate with each other.

Figure 1A:
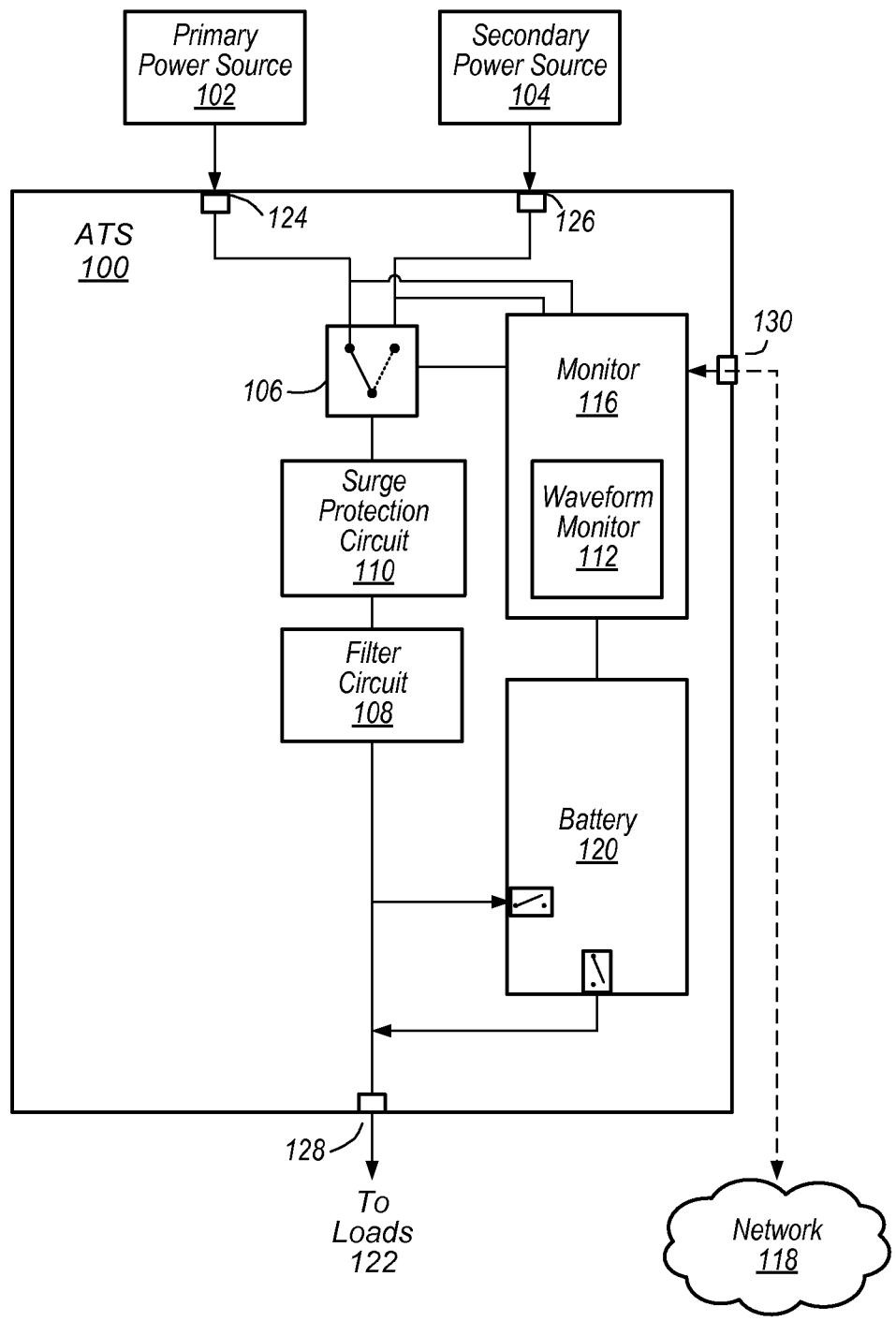
FIG. 1A is a block diagram illustrating an automatic transfer switch that comprises a surge protection circuit, a filter circuit, and a battery module, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods of supplying electrical power to downstream loads using an automatic transfer switch with a power quality module are described. According to one embodiment, a data center includes rack mounted computers and an electrical power distribution system. The electrical power distribution system includes multiple automatic transfer switches, where individual automatic transfer switches comprise a primary power input, a secondary power input and a power output, where the power output is electrically coupled to a group of the rack mounted computers of the data center. Individual automatic transfer switches also comprise a power monitor that is configured to monitor electrical power received via the primary power input. The monitor is also configured to output a signal in response to a disruption in electrical power received at the primary power input. For example, the power monitor may output a signal if a flow of electrical power to the primary power input is interrupted. Individual automatic transfer switches also include a switch configured to electrically couple the primary power input to the power output or to electrically couple the secondary power input to the power output such that electrical power received via the primary power input or the secondary power input is fed to the power output. The switch is also configured to switch to electrically couple the power output to the secondary power input instead of the primary power input in response to the signal from the power monitor. Individual automatic transfer switches comprise power quality conditioners configured to condition electrical power output from the power output of the automatic transfer switch. For example, the power quality conditioners may filter harmonic voltages or currents in the power that is output from the power output or may filter current or voltage surges in power that is output from the power output. Individual automatic transfer switches comprise a battery module configured to feed uninterrupted electrical power to the power output in response to the signal from the power monitor. For example, a battery module may provide uninterrupted electrical power to the power output while a switch of an automatic transfer switch is in the process of switching from primary power to secondary power.

According to one embodiment, an automatic transfer switch includes a primary power input, a secondary power input, a power output, a power monitor, a switch, and one or more power quality conditioners. The power monitor is configured to monitor electrical power received via the primary power input and output a signal in response to a disruption in electrical power received at the primary power input. The switch is configured to electrically couple the primary power input to the power output or to electrically couple the secondary power input to the power output, such that electrical power received via the primary power input or the secondary power input is fed to the power output. The switch is configured to switch to electrically couple the power output to the secondary power input instead of the primary power input in response to the signal from the power monitor. The one or more power quality conditioners are configured to condition electrical power output from the power output.

According to one embodiment, a method of switching power sources of an automatic transfer switch includes detecting a disruption in electrical power being received from a primary power source at a primary power input of an automatic transfer switch being fed to a power output of the automatic transfer switch. In response to detecting the disruption, switching a switch of the automatic transfer switch to receive electrical power from a secondary power source via a secondary power input of the automatic transfer switch, wherein electrical power is fed from the secondary power input to the power output. And the method includes, while the switch is switching from receiving electrical power from the primary power source to receiving electrical power from the secondary power source, feeding electrical power to the power output from a battery module of the automatic transfer switch such that uninterrupted electrical power is fed to the power output while the switch switches from receiving electrical power from the primary power source to receiving electrical power from the secondary power source.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "load", includes the output of a power infrastructure and the electrical power consumed by some or all of the power infrastructure, including the output. For example, a load in a power infrastructure may include a computing device that consumes power distributed over the power infrastructure from a power source.

As used herein, a "module" is a component or a combination of components. A module may include functional elements and systems, such as computer systems, circuit boards, as well as structural elements, such a base, frame, housing, or container.

As used herein, "power distribution unit", also referred to herein as a "PDU", means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.).

As used herein, "primary power" means any power that can be supplied to an electrical load, for example, during normal operating conditions. A power distribution system (also referred to herein as a "power system") that distributes primary power may be referred to as a primary power system.

As used herein, "reserve power," "secondary power," and "backup power" may refer interchangeably to power that can be supplied to an electrical load upon the failure of, or as a substitute for, primary power to the load. For example, a power feed from a backup generator may include backup power.

As used herein, "signal" includes an electrical or electromagnetic impulse, wave, tone, pulse, or combination thereof. A signal may serve to indicate, identify, inform, direct, instruct, command, or warn. A signal may be a discrete set of information (for example, a sequence of characters in a message), continuous (such as a wave), periodic, or a combination thereof. A signal may have any of various regular or irregular characteristics. In some embodiments, a signal includes a data packet.

As used herein, "switching device", "switch", etc. includes an electrical switch that can break an electrical current. A switching device can interrupt a power flow, divert one of the source or output of a power feed, etc. For example, a switching device may selectively route a power feed from one of two or more sources to a single output.

In some data centers, filtration of electrical power is performed by devices upstream of automatic transfer switches, such as uninterruptible power supplies (UPSs) or floor level power distribution units (PDUs), or other like devices. In some data centers, devices upstream of ATSs, such as UPSs, also provide uninterrupted electrical power to downstream systems during power disturbance events. However, these upstream components do not protect against harmonics generated in a power system downstream of the components or provide uninterrupted electrical power during power disruptions that are caused by components downstream of the upstream components. Also upstream components, such as UPSs, may be expensive to purchase and maintain. By providing a backup power source, such as a battery module, and power conditioning components, such as power quality conditioners in an automatic transfer switch (ATS), reliance on upstream components, such as UPSs and PDUs, may be reduced or eliminated. In turn, the reduced reliance on or elimination of upstream components in a power distribution system may result in additional efficiencies and reliability being realized.

In some embodiments, an ATS may comprise one or more power quality conditioners, such as surge protectors and/or current or voltage filters. In some embodiments, an ATS may comprise a battery module to provide uninterrupted power to a power output of the ATS during a power disturbance event. In some embodiments, an ATS may comprise different combinations of power quality conditioners and/or battery modules.

FIG. 1A is a block diagram illustrating an automatic transfer switch comprising power quality conditioners and a battery module, according to some embodiments. An ATS, such as ATS 100 may electrically couple to a primary power source and a secondary power source, for example ATS 100 is electrically coupled to primary power source 102 at power input 124 and electrically coupled to secondary power source 104 at power input 126. An ATS may comprise a switch that is configured to electrically couple a power output of the ATS to either a primary power input or a secondary power input. For example, ATS 100 includes switch 106. Switch 106 is electrically coupled to primary power source 102 via primary power input 124 and is electrically coupled to secondary power source 126 via secondary power input 126. Switch 106 is also electrically coupled to power output 128. A switch of an ATS, such as switch 106, may be configured to switch to electrically couple the power output to a secondary power source instead of a primary power source in response to a signal. In some embodiments, a switch, such as switch 106, may be configured to switch to electrically couple a power output to a primary power source instead of a secondary power source in response to a signal.

Power quality conditioners of an ATS, such as surge protection circuit 110 and filter circuit 108 of ATS 100, may condition electrical power before the electrical power is fed to an output of an ATS, such as output 128 of ATS 100. A surge protection circuit may limit voltages that exceed a certain voltage from passing through the surge protection circuit. In this way, a surge protection circuit may protect downstream components electrically coupled to an ATS from receiving electrical power with a voltage that exceeds a certain amount. For example, a surge protection circuit, such as surge protection circuit 110, may be configured to not allow voltages that exceed a certain amount (e.g. 120 volts, 330 volts, etc.) to pass through the surge protection circuit. An ATS that includes a surge protection circuit, such as ATS 100 that includes surge protection circuit 110, may receive electrical power from a primary or secondary power source, such as primary power source 102 or secondary power source 104, that includes a voltage spike, for example a voltage spike of 500 volts. A surge protection circuit may limit the voltage transmitted to the power output of the ATS, for example a surge protection circuit such as surge protection circuit 110 may receive electrical power that includes a 500 volt spike and output power to a power output, such as power output 128, that does not include any voltages above the certain amount (e.g. above 120 volts, 330 volts, etc.). In some embodiments, various well-known methods and devices may be used to provide a surge protection circuit.

A filter circuit, such as filter circuit 108, may filter harmonic waveforms and noise included in electrical power before the electrical power flows to an output of an ATS, such as power output 128 of ATS 100. Various components in a power distribution system may contribute to harmonic currents or voltages or noise being present in electrical power. For example, an upstream uninterruptible power supply (UPS) in a power system that feeds electrical power to a power input of an ATS, such as primary power input 124, may create harmonic currents when converting direct current (DC) power stored in a battery of the UPS to alternating current (AC) power supplied from the UPS. Loads downstream of an ATS, such as computer systems in a data center, may not function properly if electrical power received by the downstream loads includes harmonic waveforms and noise. In addition, downstream components may dissipate noise and harmonic waveforms in electrical power received by the downstream components resulting in heating of the downstream components and reduced reliability of the downstream components. In some embodiments, various well-known methods and devices may be used to provide filtration of electrical power, such as in filter circuit 108.

An ATS may also comprise a power monitor, such as monitor 116, configured to monitor electrical power received via a primary power input, such as primary power input 124, and electrical power received via a secondary power input, such as secondary power input 126. A power monitor may sense disturbances in electrical power received via the primary power input or the secondary power input and output a signal to other components of the ATS (such as switch 106) in response to the disruption in electrical power. For example, an ATS such as ATS 100, may receive electrical power from a primary power source via a primary power input, such as primary power source 102 via primary power input 124. An upstream power event in the primary power source, such as primary power source 102, may cause a disruption in electrical power being supplied by the primary power source. A power monitor, such as monitor 116, may sense the disruption in electrical power and in response output a signal to other components of an ATS, such as switch 106 and battery module 120 of ATS 100. A disruption in electrical power being received via a primary power input or a secondary power input, may result from several causes, such as upstream equipment failure, lightning strikes, power quality issues, etc. In some embodiments, a power monitor, such as power monitor 116, may be configured to rapidly sense a power disruption event and output a signal (e.g. sense a power disturbance event and output a signal within a half waveform or less when monitoring alternating current (AC) electrical power). In some embodiments, a power monitor, such as power monitor 116, may be configured to output a preliminary signal to one or more components of an ATS, such as a battery module (i.e. battery 120) and delay outputting a signal to a switch, such as switch 106, until a predetermined amount of time has passed. A power monitor may refrain from outputting a signal to a switch if electrical power is restored to a power input of an ATS within the predetermined amount of time.

A battery module, such as battery module 120, may be configured to provide, in response to a preliminary signal from a power monitor or a signal from a power monitor, uninterrupted electrical power to a power output of an ATS that is electrically coupled to one or more loads, such as power output 128 electrically coupled to loads 122. For example, power monitor 116 may detect a power disruption event in electrical power being received via primary power input 124 and output a preliminary signal to battery module 120. In response, battery module 120 may provide electrical power to power output 128 electrically coupled to loads 122. Before, a predetermined amount of time has passed, electrical power may be restored to primary power input 124 and monitor 116 may refrain from outputting the signal that would cause switch 106 to switch from electrically coupling power output 128 to secondary power input 126 instead of primary power input 124. Because switch 106 would continue to be electrically coupled to primary power input 124, when electrical power was restored to primary power input 124, the electrical power received via primary power input 124 would be fed to power output 128 via switch 106. After electrical power is restored a power monitor, such as monitor 116, may output a follow up signal to a battery module, such as battery module 120, to discontinue providing electrical power to a power output, such as power output 128 of ATS 100. In some embodiments, a battery module, such as battery module 120, may feed direct current (DC) power to a power output, such as power output 128. In some embodiments, a battery module, such as battery module 120, may include an inverter to convert DC power stored in the battery module into alternating current (AC) power and may feed AC power to a power output, such as power output 128.

An ATS such as ATS 100 may be receiving electrical power from a primary power source electrically coupled to a primary power input, such as primary power source 102 electrically coupled to primary power input 124. A piece of equipment may fail in a power system associated with the primary power source, such as primary power source 102, causing a power disruption event in the electrical power being received from the primary power source. However, electrical power may be restored in the primary power source rapidly (e.g. less than 12 milliseconds). A power monitor, such as monitor, 116, may sense the power disruption event in the primary power source, such as primary power source 102, and output a preliminary signal to a battery module, such as battery 120. The power monitor may also sense that electrical power has been restored to the primary power source within a predetermined period of time. For example, power monitor 116 may sense that electrical power has been restored to primary power input 124 before the predetermined amount of time has passed, and may refrain from outputting the signal to a switch of the ATS, such as switch 106.

In another example, an ATS, such as ATS 100 may be receiving electrical power from a primary power source via a primary power input, such as primary power source 102 via primary power input 124. A monitor of the ATS, such as monitor 116, may sense a power disruption event in the electrical power being received via a primary power input, such as primary power input 124 and output a preliminary signal. In response to the preliminary signal, a battery module, such as battery module 120, may provide uninterrupted electrical power to a power output of the ATS that is electrically coupled to one or more loads, such as power output 128 electrically coupled to loads 122. After a predetermined amount of time has passed, electrical power may not have been restored to the primary power source. In response to the predetermined amount of time passing without electrical power being restored to the primary power source, the power monitor may output a signal to a switch of the ATS, such as switch 106. For example, after the predetermined period of time passing without electrical power being restored to primary power input 124, monitor 116 may output a signal to switch 106 to switch to electrically couple power output 128 to secondary power input 126 instead of primary power input 124.

In some embodiments, a power monitor, such as power monitor 116, may output a signal to a switch of an ATS and a battery module of an ATS in response to a power disruption event without waiting a predetermined amount of time. For example, ATS 100 may receive electrical power from primary power source 102 via primary power input 124. Monitor 116 may sense a disruption in electrical power received via primary power input 124 and in response output a signal to switch 106 and battery module 120. In response to the signal, battery module 120 may provide uninterrupted electrical power to power output 128 electrically coupled to loads 122 while switch 106 switches from coupling power output 128 to secondary power input 126 instead of primary power input 124.

In some embodiments, a power monitor, such as power monitor 116, may comprise a waveform monitor, such as waveform monitor 112. A waveform monitor may store waveform patterns indicating waveforms that are associated with power disturbance events and may compare waveforms currently sensed in electrical power received via primary power input 124 or secondary power input 126 to the stored waveform patterns. A waveform monitor may identify a potential power disturbance event by determining a waveform pattern in electrical power currently being received from a primary power source or a secondary power source matches one or more stored waveform patterns indicating power disturbance events. In response to identifying a potential power disturbance event, a power monitor that includes a waveform monitor, such as monitor 116 that comprises waveform monitor 112 may output a preliminary signal to a battery module of an ATS, such as battery module 120, or may output a signal to a switch and a battery module of an ATS, such as switch 106 and battery module 120. In some embodiments, a waveform monitor, such as waveform monitor 112, may provide waveform data to remote computer systems via a network, such as network 118. In some embodiments, a waveform monitor, such as waveform monitor 112, may receive waveform pattern updates via a network, such as network 118.

In some embodiments, a waveform monitor, such as waveform monitor 112, may reduce the time required to detect a power disruption event. For example, monitoring systems that do not include a waveform monitor may determine a power disruption event based on the root-mean-square (RMS) amplitude of electrical power falling below a threshold amount. However, because RMS values are based on average amplitudes, instantaneous changes in waveform amplitudes may not be appreciable in RMS values until a full cycle or more has been sampled. By using a waveform monitor that compares currently received waveform patterns to waveform patterns that indicate power disruption events, a detection time for detecting a power disruption event may be reduced when compared to systems that do not include a waveform monitor.

Power quality conditioners may be configured in different configurations within an ATS. For example, in FIG. 1A, surge protection circuit 110 is located downstream of switch 106 and filter circuit 108 is located downstream of switch 106 and surge protection circuit 110. In configurations such as the configuration illustrated in FIG. 1A a single surge protection circuit, such as surge protection circuit 110, may provide protection against surges in electrical power received from primary power source 102 or electrical power received from secondary power source 104. Also, filter circuit 108 may filter electrical power received from primary power source 102 or electrical power received from secondary power source 104.

In some embodiments, an ATS may comprise a data interface module. For example ATS 100 comprises data interface module 130 connected to network 118. A power monitor of an ATS, such as monitor 116 of ATS 100, may provide power data to remote computer systems via a data interface, such as data interface 130. For example, monitor 116 may monitor power conditions in electrical power received from primary power source 102 and secondary power source 104 and provide data descriptive of the monitored power to remote computer systems via data interface 130 and network 118.

In some embodiments, an ATS may receive one or more switching commands from remote computer systems via a data interface. For example, power monitor 116 of ATS 100 may receive switching commands from remote computer systems connected to network 118 via data interface 130. A remote computer system may monitor power conditions in one or more electrical power distribution systems and coordinate switching of individual ATSs in a power distribution system by sending switching commands to individual ATSs via a network, such as network 118.

Figure 1B:
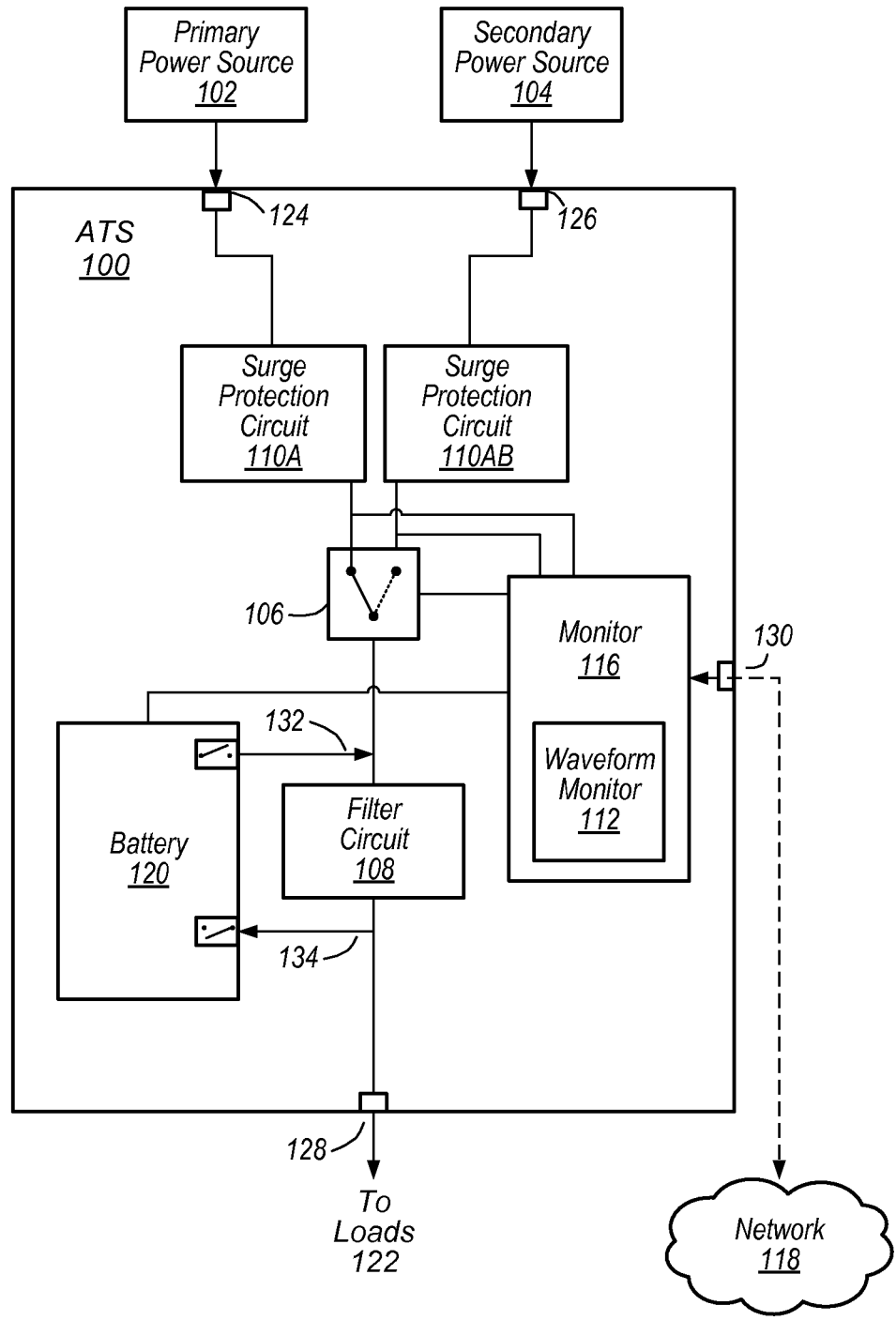
FIG. 1B is a block diagram illustrating an automatic transfer switch that comprises a surge protection circuit, a filter circuit, and a battery module, according to some embodiments.

FIG. 1B is a block diagram of an ATS comprising power quality conditioners and a battery module in a different configuration than the configuration illustrated in FIG. 1A, according to some embodiments. In some embodiments, surge protection circuits may be located upstream of a switch of an ATS. Locating surge protection circuits upstream of a switch of an ATS may require multiple surge protection circuits, but may also provide additional protection against voltage surges or current surges for the switch of the ATS. In FIG. 1B, surge protection circuits 110A and 110B are located upstream of switch 106. A power monitor, such as power monitor 116, may monitor electrical power received via a primary power input or a secondary power input downstream of surge protection circuits, such as surge protection circuits 110A and 110B. Monitoring electrical power downstream of surge protection circuits may protect a power monitor, such as monitor 116, from being damaged by voltage or current surges. In some embodiments, a filter circuit may be located downstream of a battery module feed. A filter circuit downstream of a battery module feed may filter any harmonic currents, harmonic voltages, or noise created by the battery module. In FIG. 1B, filter circuit 106 is located downstream of battery feed 132 from battery module 120 and upstream of battery supply 134 to battery module 120.

Figure 1C:
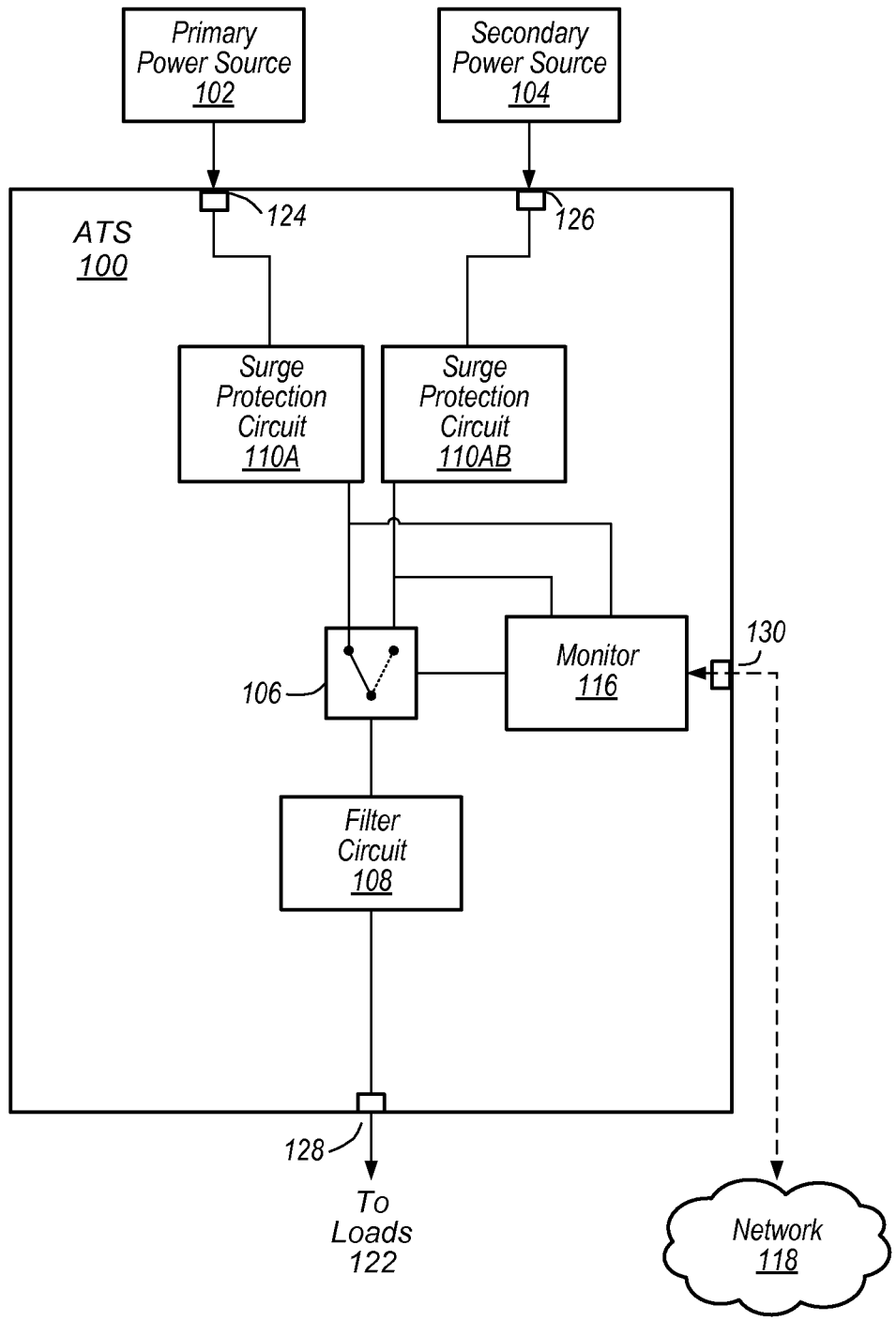
FIG. 1C is a block diagram illustrating an automatic transfer switch that comprises a surge protection circuit and a filter circuit, according to some embodiments.

FIG. 1C is a block diagram of an ATS comprising power quality conditioners, according to some embodiments. In a similar manner as the ATS illustrated in FIG. 1B, ATS 100 in FIG. 1C includes surge protection circuits 110A and 110B located upstream of switch 106. In some embodiments, an ATS may comprise power quality conditioners without comprising a battery module, such as ATS 100 illustrated in FIG. 1C.

Figure 1D:
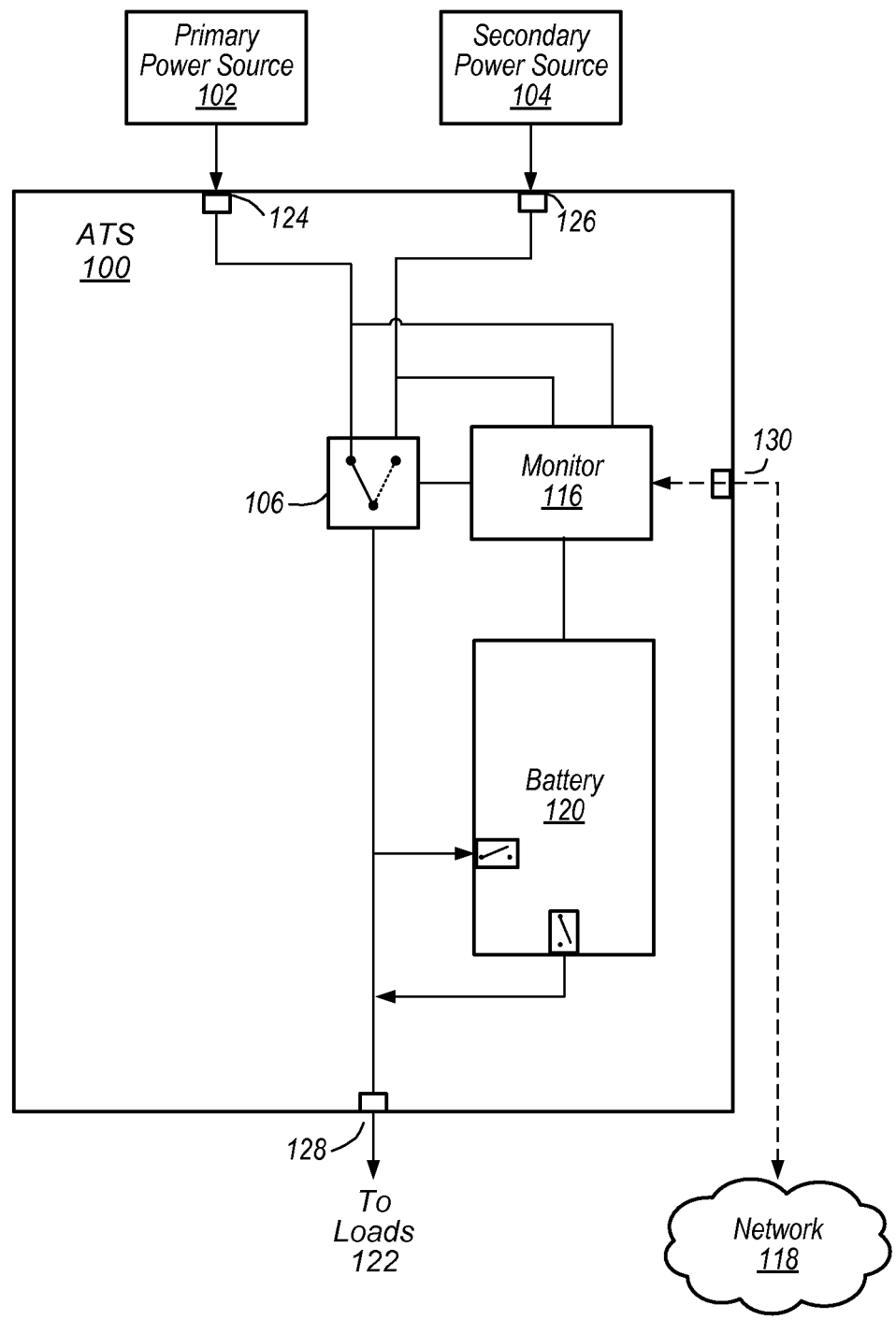
FIG. 1D is a block diagram illustrating an automatic transfer switch that comprises a battery module, according to some embodiments.

FIG. 1D is a block diagram of an ATS comprising a battery module, according to some embodiments. In a similar manner as the ATS illustrated in FIGS. 1A and 1B ATS 100 illustrated in FIG. 1D includes a battery module 120 that is configured to receive a preliminary signal or signal from monitor 116. In some embodiments, an ATS may comprise a battery module without comprising one or more power quality conditioners, such as ATS 100 illustrated in FIG. 1D. A power monitor, switch, and battery module of an ATS that does not include power quality conditioners may function in a similar manner as a battery module in an ATS that comprises power quality conditioners. For example, battery module 120 of ATS 100 illustrated in FIG. 1D may function in a similar manner as battery module 120 of ATS 100 illustrated in FIG. 1A.

Figure 2:
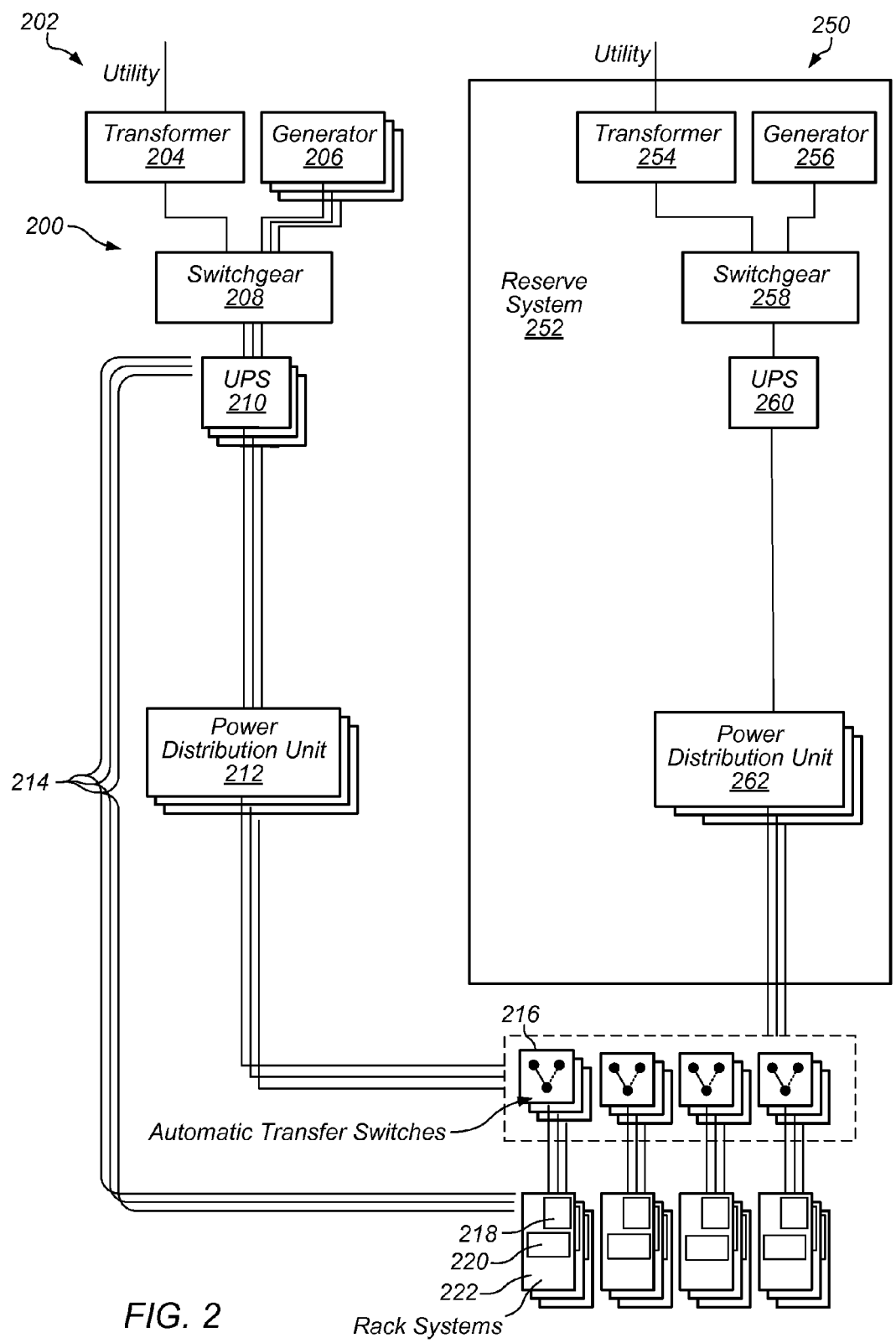
FIG. 2 is a block diagram illustrating power distribution systems in a data center, according to some embodiments.

FIG. 2 illustrates a data center comprising primary power systems and a reserve power system that supply electrical power to automatic transfer switches, according to some embodiments. FIG. 2 illustrates an example data center that may include any of the ATSs 100 described in regards to FIGS. 1A-1D. Data center 200 includes racks 222, primary power side 202 and reserve power side 250. Reserve power side 250 includes reserve power system 252. Data center 200 shown in FIG. 2, includes automatic transfer switches (ATSs) 216 electrically coupled to primary power side 202 and reserve power side 250. ATSs 216 may be any of ATSs 100 illustrated in FIGS. 1A-1D.

Primary power side 202 includes transformer 204, generators 206, and switchgear 208, and primary power systems 214. Sets of computer systems 220 in racks 222 may perform computing operations in data center 200. Computer systems 220 may be, for example, servers in a server room of data center 200. Computer systems 220 in racks 222 may each receive power from one of primary power systems 214. In one embodiment, each of primary power systems 214 corresponds to, and provides power to, the servers in one room in data center 200. In one embodiment, each of primary power systems 214 corresponds to, and provides power to, one half of a rack system in data center 200.

Primary power systems 214 each include UPS 210 and floor power distribution unit 212. Floor power distribution unit 212 provides power to various racks 222. In some embodiments, floor power distribution unit 212 includes a transformer that transforms the voltage from switchgear 206. Each of racks 222 may include a rack power distribution unit 218. Rack power distribution units 218 may distribute power to computer systems 220.

Transformer 204 is coupled to a utility feed. The utility feed may be a medium voltage feed. In certain embodiments, the utility feed is at a voltage of about 13.5 kilovolts or 12.8 kilovolts at a frequency of about 60 Hz. Generators 206 may provide power to primary power systems 214 in the event of a failure of utility power to transformer 204. In one embodiment, one of generators 206 provides back-up power for each of primary power systems 214.

Reserve power system 252 may provide reserve power for all of the computer systems 220 supplied by primary power systems 214. In some embodiments, reserve power system 252 is powered up at all times during operation of data center 200. Reserve power system 252 may be passive until a failure of one or more components of primary power side 202, at which time reserve power system 252 may become active.

For illustrative purposes, three primary power systems are shown in FIG. 2 (for clarity, details of only the front primary power system 214 are shown). The number of primary power systems 214 on primary power side 202 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 214 includes many floor power distribution units 212.

Reserve power system 252 includes transformer 254 and generator 256. Transformer 254 may supply power to switchgear 258. Floor power distribution unit 262 may receive power from switchgear 258. Power from switchgear 258 may pass through UPS 260.

ATSs 216 may be electrically coupled to individual ones of primary power systems 214 at a primary power input of an ATS 216 and electrically coupled to reserve power system 252 at a secondary power input of an ATS 216. A power output of an ATS 216 may be electrically coupled to a rack PDU 218 that feeds electrical power to a group of computer systems 220 in a rack 222.

ATSs 216 may include power quality conditioners, such as surge protection circuit 110 and filter circuit 108 described in FIGS. 1A-1D. Various causes may result in a current or voltage surge in primary or secondary power systems, such as primary power systems 214 or reserve power system 252. For example, a power surge (current or voltage) may result when a switchgear, such as switchgear 208 in primary power systems 214 is switched from feeding generator power from generator 206 to feeding utility power from transformer 204. In another example, a lighting strike in utility feed to generator 204 may result in a voltage spike in primary power systems 214. In some embodiments, a primary power system or a secondary power system, such as primary power systems 214 or reserve power system 252 may not include surge protection in UPSs, such as UPS 210 and 260 or may not include surge protection in floor power distribution units, such as PDU 212 and PDU 260. In primary and secondary power systems that do not include surge protection in UPSs or PDUs, surge protection may be provided by a surge protection circuit in an ATS, such as ATSs 216. Power quality pollution such as harmonic currents, harmonic voltages, or noise may result from various causes. For example, a UPS in a primary power system, such as UPS 210, may cause harmonic currents when an inverter of the UPS converts DC power stored in a battery of the UPS to AC current. Because an inverter of the UPS may not form an ideal sine wave when converting the DC power stored in a battery of the UPS to AC power, harmonic currents may result from the non-ideal sine wave generated by the inverter of the UPS. As another example, disturbances in electrical power flow due to switching in related systems or upstream systems may result in noise in electrical power received at transformer 204 of primary power system 214.

In some embodiments, rack power distribution units 218 include surge protection and power filtering. In some embodiments, power quality conditioners of individual ATSs 216 include surge protection and power quality conditioners such as surge protection circuits 110, 110A, and 110B, and filter circuit 108 described in FIGS. 1A-1D. The power quality conditioners of individual ATS may condition electrical power such that computer systems 222 are protected from power surges without surge protection being included in rack PDUs, such as rack PDUs 218. The power quality conditioners of individual ATS may condition electrical power such that computer systems 222 do not receive current harmonics, voltage harmonics, or noise even without power filtering being included in rack PDUs, such as rack PDUs 218.

Power quality conditioners in an ATS may isolate disturbances downstream of an ATS from propagating upstream and affecting other computer systems that share a common power source with the ATS. For example, a faulty component in a particular computer system of computer systems 220 may cause harmonic currents. The harmonic currents may propagate upstream to a particular ATS of ATSs 216 that feeds the group of computer systems that includes the particular computer system causing the harmonic currents. However, power quality conditioners in the particular ATS of the ATSs 216 may prevent the harmonic currents from propagating upstream to a power distribution unit, such as PDU 212 or PDU 262. In this way, only the computer systems in the group of computer systems that receive electrical power from the particular ATS may be affected by the faulty computer system causing harmonic currents, and other groups of computer systems receiving electrical power form other ATSs may not be affected.

In some embodiments, a UPS in a power system, such as UPS 210 in primary power system 214 may operate in an active mode or a bypass mode. In an active mode, a UPS may feed electrical power to an output of the UPS from a battery of the UPS. In a bypass mode, electrical power flowing through the UPS may bypass a battery of the UPS. A period of time may pass while a UPS detects a loss of line voltage and switches from a bypass mode to an active mode. In some situations, a UPS may require as much as 25 milliseconds to switch form a bypass mode to an active mode. In some embodiments, a battery module of an ATS may provide uninterrupted electrical power to loads electrically coupled to the ATS while an upstream UPS transitions from a bypass mode to an active mode. For example, ATSs 216 may include a battery module such as battery modules 120 described in FIGS. 1A-1D. UPS 210 may be operating in a bypass mode and a power disruption event may occur in primary power system 214. During the time UPS 210 is transitioning from a bypass mode to an active mode, battery modules in ATSs 216 may provide uninterrupted electrical power to computer systems 220.

Figure 3A:
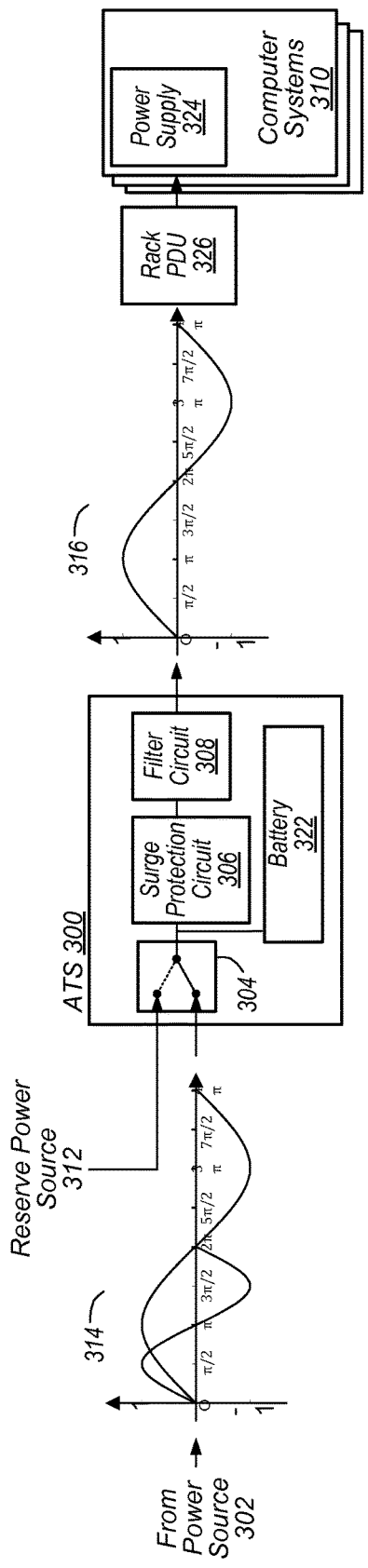
FIG. 3A is a block diagram illustrating an automatic transfer switch receiving electrical power that includes current or voltage harmonics, according to some embodiments.
Figure 3B:
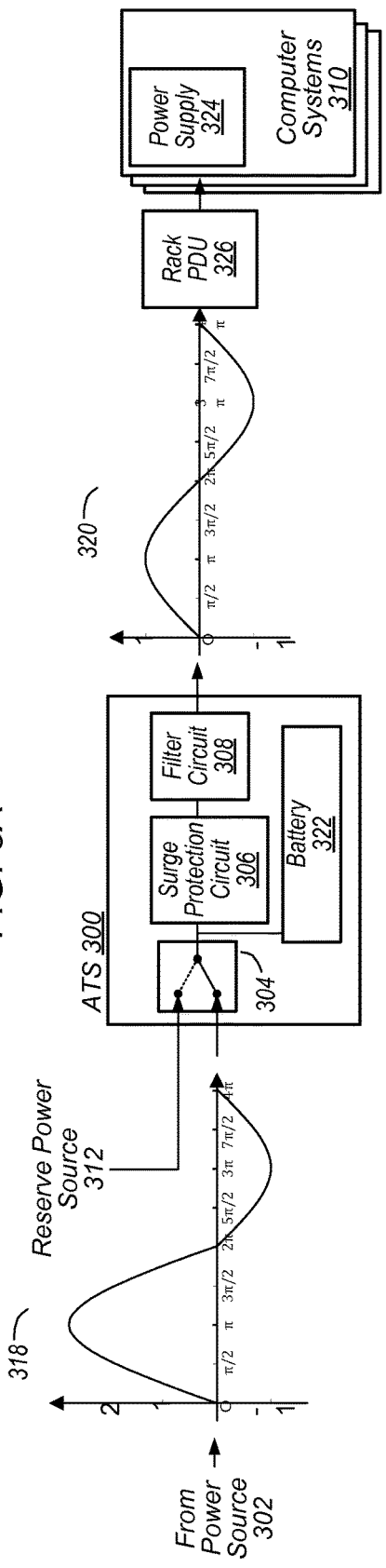
FIG. 3B is a block diagram illustrating an automatic transfer switch receiving electrical power that includes a current or voltage surge, according to some embodiments.

FIGS. 3A and 3B illustrate electrical power being conditioned by power quality conditioners of an ATS, such as ATS 100 in FIGS. 1A-1D or ATSs 216 in FIG. 2.

FIG. 3A illustrates an example of an automatic transfer switch filtering harmonic currents or voltages, according to some embodiments. ATS 300 in FIG. 3A may be any of the ATSs 100 illustrated in FIGS. 1A-1D or ATSs 216 illustrated in FIG. 2. ATS 300 includes a switch 304, a surge protection circuit 306 a filter circuit 308, and a battery module 322. In some embodiments, an ATS may include different combinations of a filter circuit, a surge protection circuit, and a battery. In some embodiments, an ATS may not include all of these components (i.e. filter circuit, surge protection circuit, or battery module). ATS 300 is electrically coupled to power source 302 and reserve power source 312. Electrical power received from power source 302 may include harmonic current or voltages. For example, electrical power 314 includes current harmonics, where two current waveforms oscillate at different frequencies. Filter circuit 308, may filter the harmonic currents or voltages received in the electrical power 314 from power source 302, such that electrical power with a waveform that more closely resembles an ideal sine wave is fed from the power output of ATS 300. For example, filtered electrical power 316 fed from the power output of ATS 300 comprises a sine wave that oscillates at a single frequency. Filtered electrical power 316 may flow to a rack PDU, such as rack PDU 326 that distributes electrical power to a group of computer systems, such as computer systems 310. Individual computer systems may comprise power supplies, such as power supplies 324. Filtering electrical power in an ATS, such as ATS 300 may reduce heating of downstream components such as power supplies 324 and rack PDUs 326. In systems that include ATSs that do not include a power filter circuit, power filtering may take place in a rack PDU or a power supply of a computer system. Unfiltered harmonic currents, harmonic voltages, or noise in a rack PDU or in a power supply of a computer system may cause the rack PDU or power supply to increase temperature and may also reduce the reliability of rack PDUs and power supplies of computer systems.

In some embodiments, a filter circuit in an ATS, such as filter circuit 308 of ATS 300 may provide sufficient current and voltage filtration such that rack PDUs, such as rack PDUs 326 do not include filtration circuits.

FIG. 3B illustrates an example of an automatic transfer switch filtering current or voltage surges, according to some embodiments. ATS 300 in FIG. 3A may be any of the ATSs 100 illustrated in FIGS. 1A-1D or ATSs 216 illustrated in FIG. 2. ATS 300 illustrated in FIG. 3B may comprise the same components as ATS 300 illustrated in FIG. 3A.

In FIG. 3B, ATS 300 receives electrical power 318 from power source 302. Electrical power 318 may include a current surge or voltage surge. For example electrical power 318 may include a voltage that has a first peak amplitude that is several times greater than subsequent or average peak amplitudes. For ease of illustration, only a single period of a wave is illustrated in electrical power 318 in FIG. 3B. However, electrical power 318 may include transients that occur through multiple periods of a waveform in electrical power 318. Electrical power 318 is received at a power input of ATS 300 and flows through switch 304 to surge protection circuit 306. Surge protection circuit 306 may limit the current or voltage of electrical power flowing through surge protection circuit 306 to not exceed a certain amount. For example surge protection circuit 306 may limit the voltage of electrical power 318 so that the voltage peaks do not exceed the steady state voltage amplitudes of electrical power 318. In some embodiments, a surge protection circuit may allow voltages in electrical power 318 to deviate from steady state voltage by a predetermined margin. Electrical power leaving an ATS, such as electrical power 320, may resemble an ideal sine wave with transient voltage spikes, such as the transient voltage spikes in electrical power 318, removed from the electrical power 320. Electrical power 320 may flow to a rack PDU, such as rack PDU 326. Rack PDU 326 may be electrically coupled to a group of computer systems and distribute electrical power to the group of computer systems. For example, rack PDU 326 may be electrically coupled to computer systems 310. Current or voltage surges, such as the transient voltage spike in electrical power 318 may damage downstream components if not filtered from electrical power provided to downstream components. For example, rack PDU 326, power supply 324, and computer systems 310 may be damaged by current or voltage surges, such as the current or voltage surges of electrical power 318. In some embodiments, a rack PDU, such as rack PDU 326, may include surge protectors. In some embodiments, a surge protection circuit of an ATS, such as surge protection circuit 306 of ATS 300 may protect computer systems 310 and power supplies 324 from current or voltage surges without a surge protection circuit being included in rack PDUs, such as rack PDU 326.

Figure 4A:
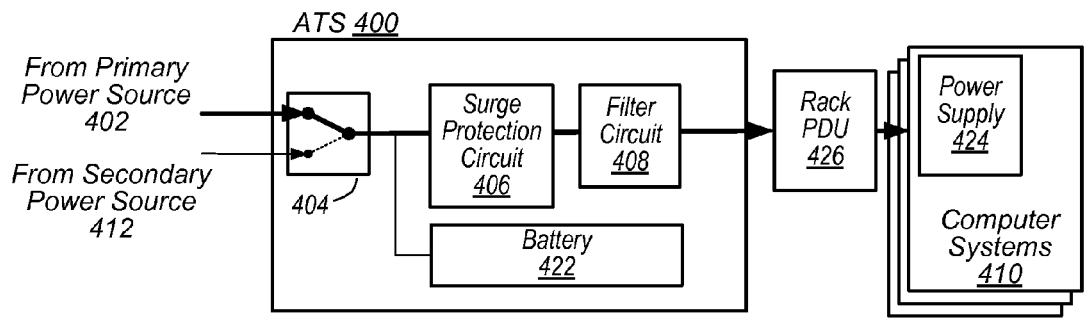
FIG. 4A is a block diagram illustrating an automatic transfer switch receiving electrical power from a primary power source, according to some embodiments.
Figure 4B:
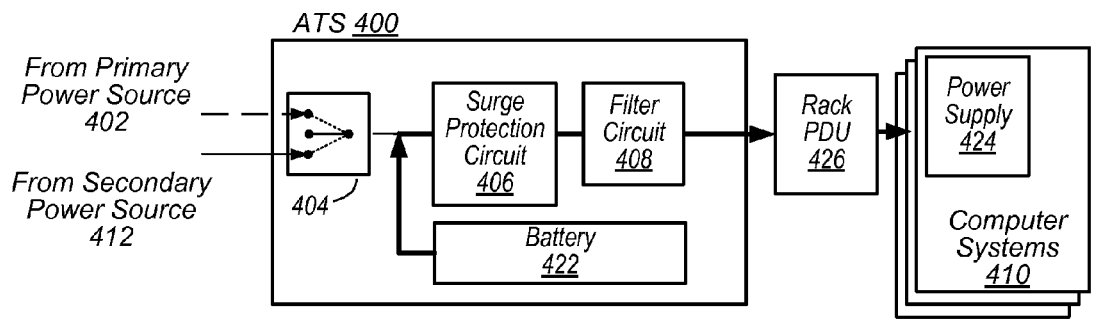
FIG. 4B is a block diagram illustrating an automatic transfer switch switching from a primary power source to a secondary power source, according to some embodiments.
Figure 4C:
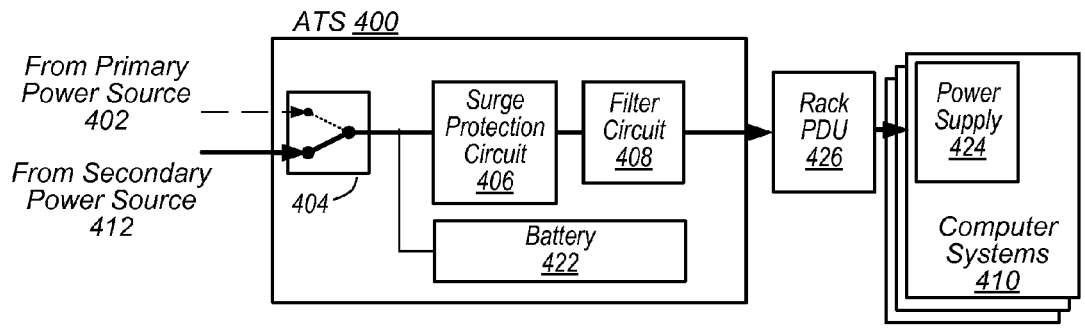
FIG. 4C is a block diagram illustrating an automatic transfer switch receiving electrical power from a secondary power source, according to some embodiments.

FIGS. 4A-C illustrate an ATS switching to receive electrical power from a secondary power source instead of a primary power source and a battery module of the ATS providing uninterrupted electrical power while the switch switches from the primary power source to the secondary power source, according to some embodiments.

FIG. 4A illustrates ATS 400 that includes switch 404, surge protection circuit 406, filter circuit 408, and battery module 422. Switch 404 is electrically coupled to primary power source 402 and secondary power source 404. An output of ATS 400 is electrically coupled to rack PDU 426. Rack PDU 426 distributes electrical power to a group of computer systems 410 that include power supplies 424. The bold faced line in FIG. 4A illustrates a path of electrical power from primary power source 402 to computer systems 410. Electrical power from primary power source 402 flows through switch 404. From switch 404 electrical power from primary power source 402 flows through surge protection circuit 406 and filter circuit 408 to an output of ATS 400 electrically coupled to computer systems 410 via rack PDU 426 and power supplies 424. FIG. 4A illustrates a normal state power flow prior to a power disruption event.

FIG. 4B illustrates an ATS switching from a primary power source to a secondary power source in response to a power disruption event, according to some embodiments. The dashed line coming from primary power source 402 indicates that electrical power feed has been disrupted from primary power source 402 and electrical power is not being received at switch 404 from primary power source 402. A power monitor (not illustrated) of ATS 400 may sense the disruption of electrical power being received from primary power source 402 and output a signal to switch 404 and battery module 422. In response to receiving the signal from the power monitor, switch 404 may begin to switch to electrically couple the output of ATS 400 to secondary power source 412 instead of primary power source 402. In some embodiments, sensing the disruption in electrical power received from primary power source 402 and switching to electrically couple the output of ATS 400 to secondary power source 412 instead of primary power source 402 may take as long as 12 milliseconds.

A battery module of an ATS, such as battery module 422, may also receive the signal from the power monitor (not illustrated) and in response to receiving the signal, provide electrical power to the power output of the ATS while the switch switches from the primary power source to the secondary power source. For example, as illustrated in FIG. 4B, switch 404 is in the process of switching from primary power source 402 to secondary power source 412. At the same time, battery module 422 is providing electrical power to the output of ATS 400 while the switch is switching. The flow of electrical power from battery module 422 is indicated by the bold faced line.

In some embodiments, a battery module in an ATS, such as battery module 422, may provide electrical power in response to a power disruption event considerably faster than a switch of an ATS, such as switch 404, can switch form a primary power source to a secondary power source. Because a battery module of a ATS can provide electrical power in response to a power disruption event faster than an ATS can switch from a primary power source to a secondary power source, an amount of electrical charge stored in downstream power supplies, such as power supplies 424 may be reduced. Downstream power supplies when operated in combination with an ATS with a battery module may provide uninterrupted electrical power to computer systems, such as computer systems 410, even though the downstream power supplies store an amount of electrical charge less than an amount of electrical charge required to provide power to the computer systems while a switch of an ATS switches from a primary power source to a secondary power source.

FIG. 4C illustrates an automatic transfer switch that has switched from receiving electrical power from a primary power source to instead receiving electrical power from a secondary power source, according to some embodiments. ATS 400 in FIG. 4C may be the same ATS 400 illustrated in FIGS. 4A and 4B. The dashed line from primary power source 402 indicates that electrical power from primary power source 402 is unavailable. In FIG. 4C, switch 404 has completed switching from receiving electrical power from power source 402 and is now aligned to receive electrical power from secondary power source 412. Electrical power flows from secondary power source 412 through surge protection circuit 406, filter circuit 408, and to an output of ATS 400 that is electrically coupled to Rack PDUs 426 and computer systems 410. Battery module 422 is no longer feeding electrical power to the output of ATS 400. In some embodiments, a power monitor of ATS 400 (not illustrated) may send a follow up signal to battery module, such as battery module 422. In response to the follow up signal, a battery module, such as battery module 422, may discontinue feeding electrical power to an output of an ATS, such as ATS 400. In some embodiments, a battery module 422 may sense that electrical power has been restored to the output of switch 404 and in response discontinue feeding electrical power to an output of the ATS. In some embodiments, a battery module 422 may use a portion of electrical power flowing through an ATS to re-charge a battery of a battery module. For example, battery module 422 may use a portion of the electrical power from secondary power source 412 flowing through ATS 400 to replace a charge of a battery of battery module 422 that was dissipated when battery module 422 fed electrical power to the power output of ATS 400 while switch 404 was switching from primary power source 402 to secondary power source 412.

In some embodiments, a battery module, such as battery module 422 may feed direct current (DC) electrical power. A power supply of a computer system, such as power supplies 424 or computer systems 410 may be configured to receive DC electrical power for short periods of time. In some embodiments, a battery module, such as battery module 422, may feed electrical power to the output of an ATS, such as ATS 400 downstream of a filter circuit, such as filter circuit 408.

Figure 5A:
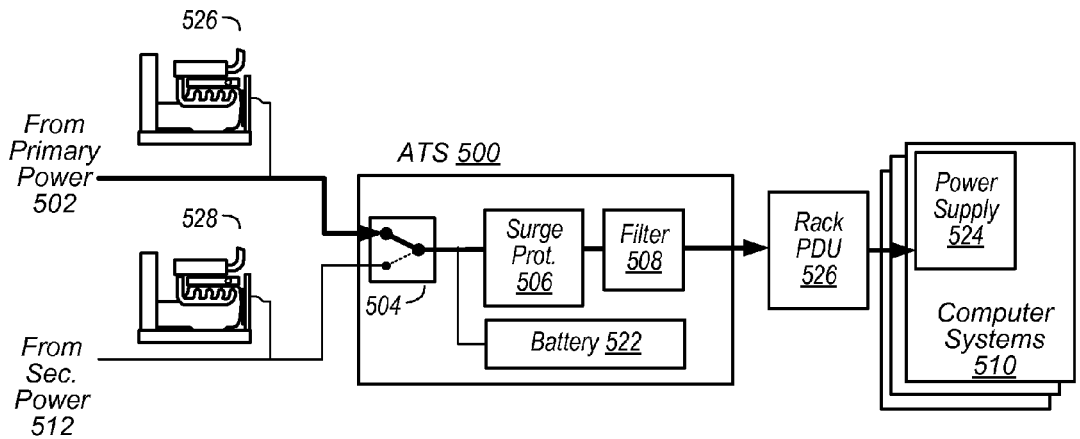
FIG. 5A is a block diagram illustrating an automatic transfer switch receiving electrical power from a primary power source, according to some embodiments.
Figure 5B:
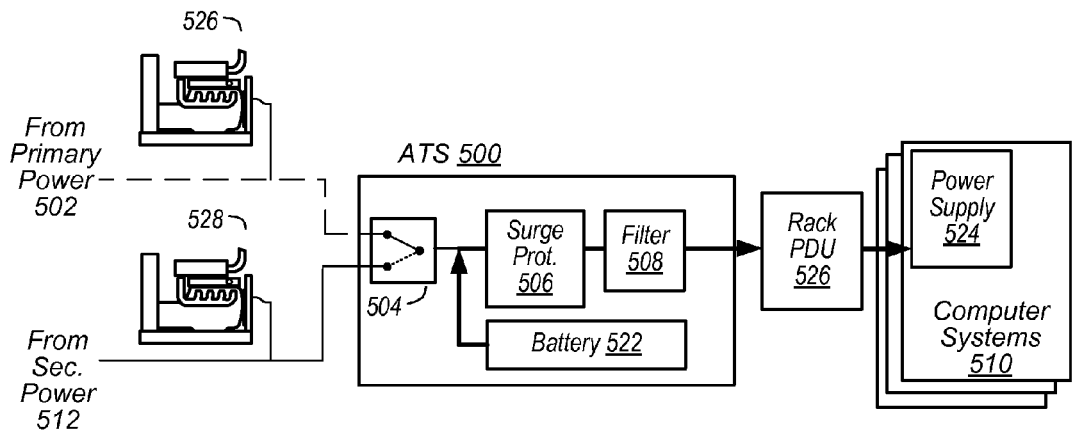
FIG. 5B is a block diagram illustrating an automatic transfer switch supplying electrical power from a battery module, according to some embodiments.
Figure 5C:
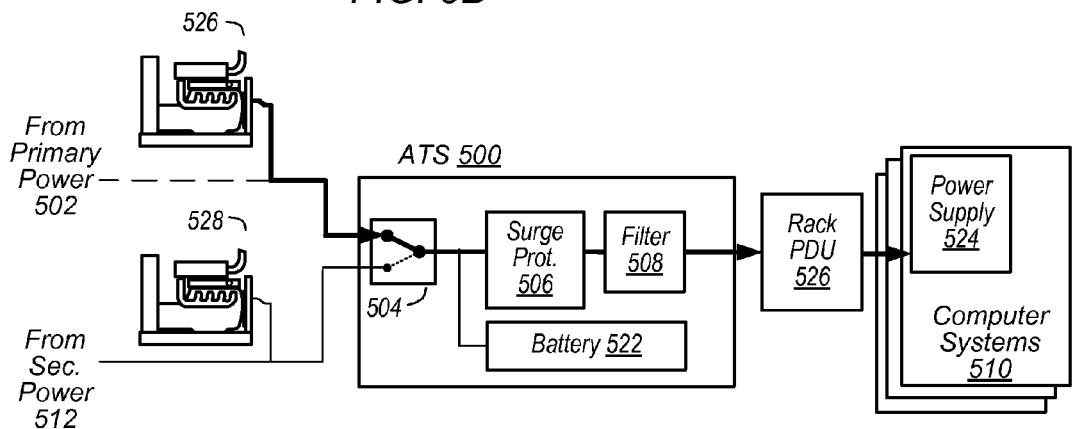
FIG. 5C is a block diagram illustrating an automatic transfer switch receiving electrical power from a generator of a primary power system, according to some embodiments.

FIGS. 5A-5C illustrate a battery module of an ATS providing uninterrupted electrical power to an output of the ATS while a generator in a power system feeding the ATS is transitioned from an off or idle state to a power generating state, according to some embodiments.

FIG. 5A illustrates an ATS electrically coupled to a primary power system, a secondary power system, and a rack PDU that is electrically coupled to a group of computer systems, according to some embodiments. ATS 500 is electrically coupled to primary power system 502 and secondary power system 512. Primary power system 502 includes generator 526. Secondary power system 512 includes generator 528. ATS 500 includes switch 504, surge protection circuit 506, filter circuit 508, battery module 522, and a power monitor (not illustrated). Rack PDU 526 distributes electrical power from ATS 500 to computer systems 510 that include power supplies 524. FIG. 5A illustrates a normal state of a power distribution system prior to a power disruption event.

FIG. 5B illustrates a power disruption event in electrical power received from a primary power system, according to some embodiments. FIG. 5B illustrates the same power distribution system as in FIG. 5A while a power disruption event is taking place in a primary power source. A power monitor of an ATS may sense a disruption of electrical power being received from a primary power source, such as primary power source 502. In response to sensing the disruption, the power monitor may send a preliminary signal to a battery module, such as battery module 522. A power monitor may refrain from sending a signal to a switch, such as switch 504 for a predetermined amount of time. After the predetermined amount of time has passed, if electrical power has not been restored to a power input of the ATS electrically coupled to the primary power system, the power monitor may output a signal to a switch of the ATS to switch to receive electrical power from a secondary power source. FIG. 5B illustrates battery module 522 providing electrical power to an output of ATS 500 in response to receiving a preliminary signal from a power monitor of the ATS. FIG. 5B also illustrates switch 504 remaining positioned to receive electrical power from primary power source 502 during the predetermined amount of time between the power monitor outputting the preliminary signal and the power monitor outputting the signal to switch 504.

FIG. 5C illustrates a generator in a primary power system providing electrical power during a power disruption event, according to some embodiments. As discussed in regard to FIG. 5B, a power monitor of an ATS may refrain from outputting a signal to a switch of an ATS to switch to feeding electrical power from a secondary power system instead of a primary power system. In some embodiments, a power monitor may delay outputting a signal to a switch of an ATS to switch from a primary power source to a secondary power source for a length of time that allows a generator in a primary power system to transition from an idle or off state to a power generating state (e.g. approximately 45 seconds). If electrical power is restored to a primary power source within the predetermined amount of time (e.g. 45 seconds) the power monitor of the ATS may reset and a switch of the ATS may continue to couple the primary power source to the output of the ATS and allow the restored electrical power to be fed from the primary power source to the output of the ATS. In FIG. 5C the bold faced line indicates the path of electrical power flowing from primary power system 502 to computer systems 510. In FIG. 5C generator 526 has been transitioned from an idle or off state during the predetermined amount. Switch 504 continues to electrically couple primary power source 502 to an output of ATS 500 electrically coupled to computer systems 510 via rack PDU 526. Electrical power flows from generator 526 in primary power system 502 to ATS 500 and to computer systems 510.

If electrical power is not restored to a primary power input of an ATS within the predetermined amount of time, a power monitor of an ATS may output a signal to a switch of the ATS to switch to a secondary power source. For example, if electrical power was not restored in primary power system 502 within the predetermined amount of time, a power monitor of ATS 500 may output a signal to switch 504 to switch to electrically couple the output of ATS 500 to secondary power source 512.

In some embodiments, an ATS, such as ATS 500, may include a data interface that is configured to send information about power monitored by a power monitor of the ATS to one or more remote computer systems via a network. An ATS with a data interface may also receive switching commands via a data interface. For example, an ATS 500 may send data via a data interface connected to a network in response to detecting a power disruption event. One or more remote computer systems connected to the network may receive the data regarding the power disruption event and communicate with generators in a primary or secondary power system to command the generators to transition from an idle or off state to a power generating state. For example, a data interface of ATS 500 may provide data to one or more remote computer systems indicating a power disruption event in primary power system 502. In response, the one or more remote computer systems may output a command to generator 502 to transition from an idle or off state to a power generating state.

Figure 6:
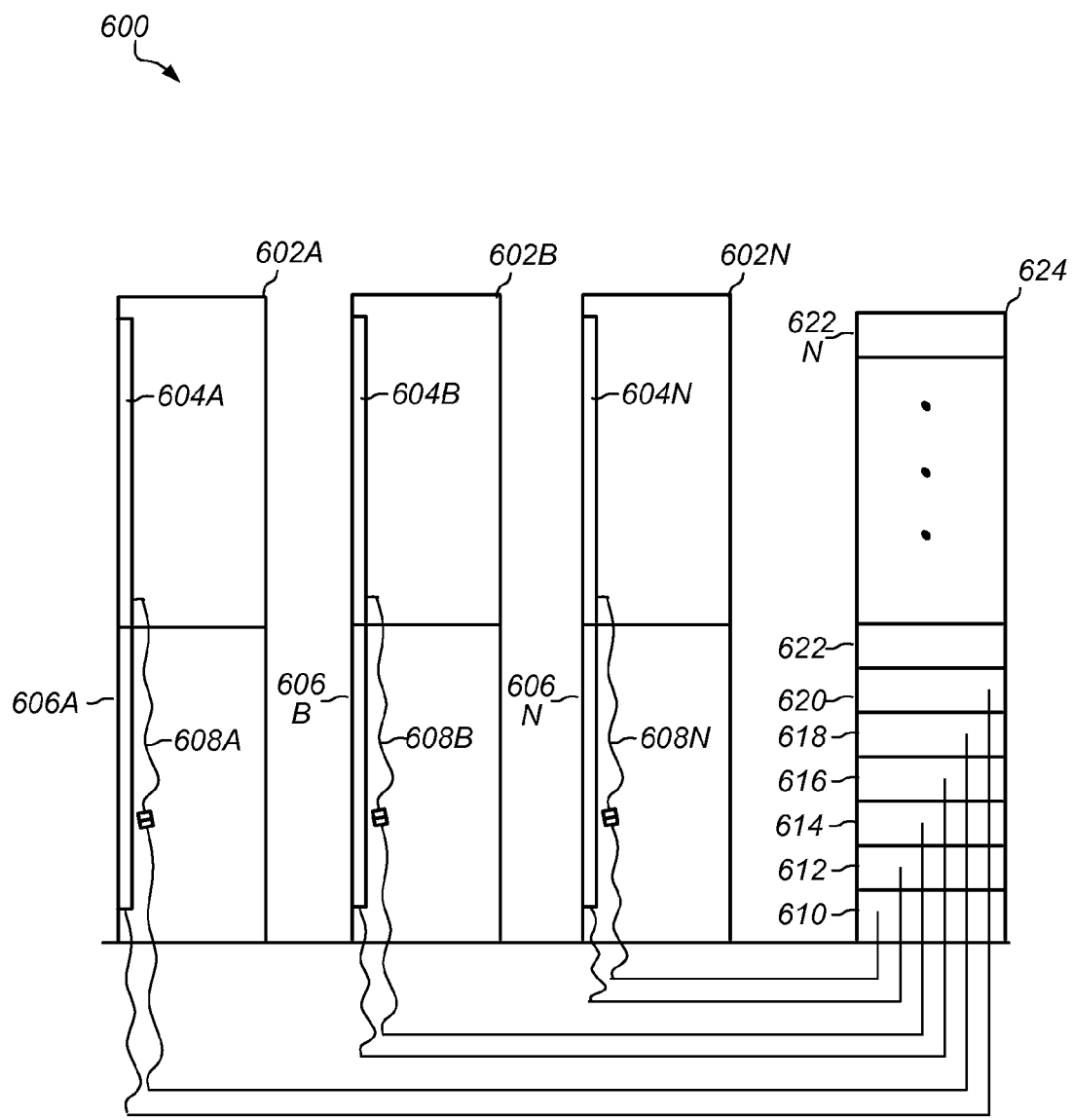
FIG. 6 illustrates a room of a data center comprising a set of racks and an automatic transfer switch cabinet, according to some embodiments.

FIG. 6 illustrates a data center that includes racks and an ATS cabinet, according to some embodiments. Data center 600 includes racks 602A, 602B, and 602N. Three sets of racks are illustrated. However, a data center may include any number of racks 602. Data center 600 also includes ATS cabinet 624. In FIG. 6, ATS cabinet 624 and racks 602 are illustrated in the same room. In some embodiments, an ATS cabinet, such as ATS cabinet 624 may be located in a separate room from racks that receive electrical power from ATSs in the ATS cabinet.

An ATS may be enclosed in an enclosure that is configured to mount in a slot of an ATS cabinet. In some embodiments, an ATS may mount into a slot of an ATS cabinet by placing the ATS on a shelf of the ATS cabinet. In some embodiments one or more brackets may be used to mount an ATS into a slot of an ATS cabinet. An ATS that comprises an enclosure may include a switch and one or more power quality conditioners enclosed within the enclosure. For example, each ATSs 610, 612, 614, 616, 618, 620, 622, and 622N may include an enclosure that encloses a switch and one or more power quality conditioners. In some embodiments, a battery module may also be enclosed in an enclosure of an ATS.

In data center 600 illustrated in FIG. 6, each ATS of ATSs 610, 612, 614, 616, 618, 620, and 622 feed electrical power to a rack level PDU that supplies electrical power to half a rack. For example, ATS 620 is electrically coupled to rack PDU 608A and ATS 618 is electrically coupled to rack PDU 604A. In some embodiments, one or more power cables may be used to electrically couple an ATS to a rack level PDU. For example, power cable 608A electrically couples with a power line from ATS 618 and rack PDU 604A.

Rack PDUs may each distribute electrical power to a group of computer systems mounted in a rack. For example, rack PDU 604A, 604B, thru 604N and rack PDU 608A, 608B, thru 608N may each distribute electrical power to separate groups of computer systems. ATSs that include power quality conditioners, such as a filter circuit, may prevent current harmonics, voltage harmonics, or noise caused by a particular computer system from propagating to computer systems in separate groups that receive electrical power from a different rack PDU than the particular computer system. For example, a computer system that receive electrical power from rack PDU 604B may cause harmonic currents due to a fault within the computer system. However, ATS 614 through which electrical power to rack PDU 604B flows may include a filter circuit. The harmonic currents caused by the computer system may affect the electrical power received by other computer systems electrically coupled to rack PDU 604B, but ATS 614 may filter out the harmonic currents so that they do not propagate upstream and affect other computer systems such as other computer systems that receive electrical power from ATSs mounted in ATS cabinet 624.

Figure 7B:
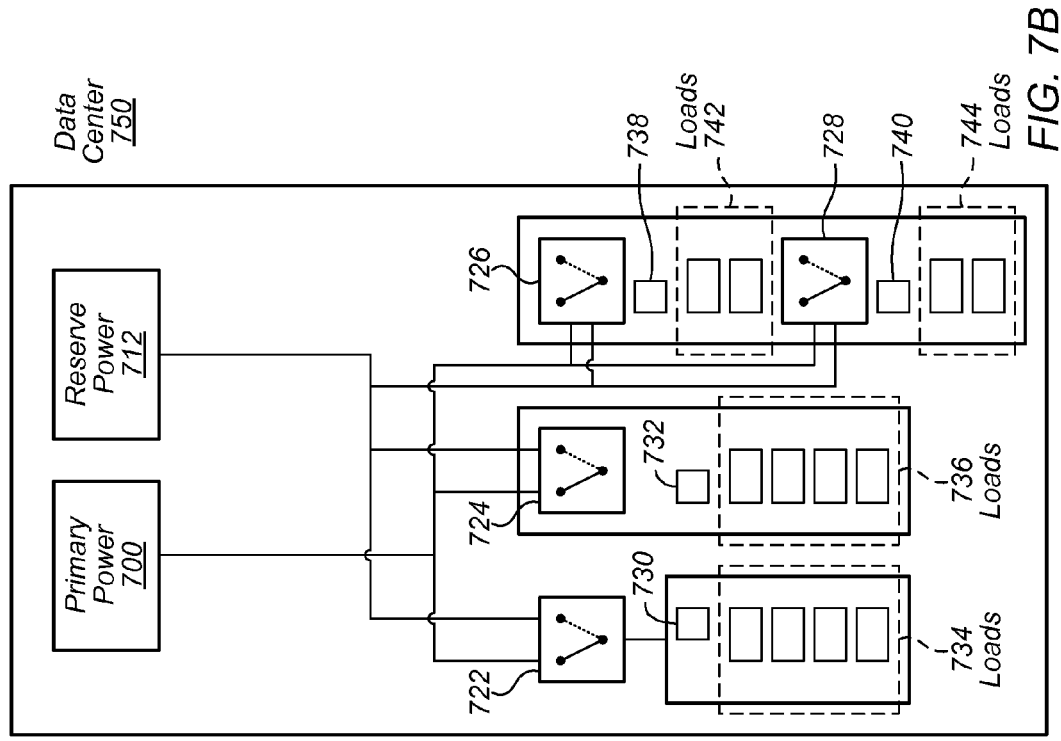
FIG. 7B illustrates a data center including automatic transfer switches, according to some embodiments
Figure 7A:
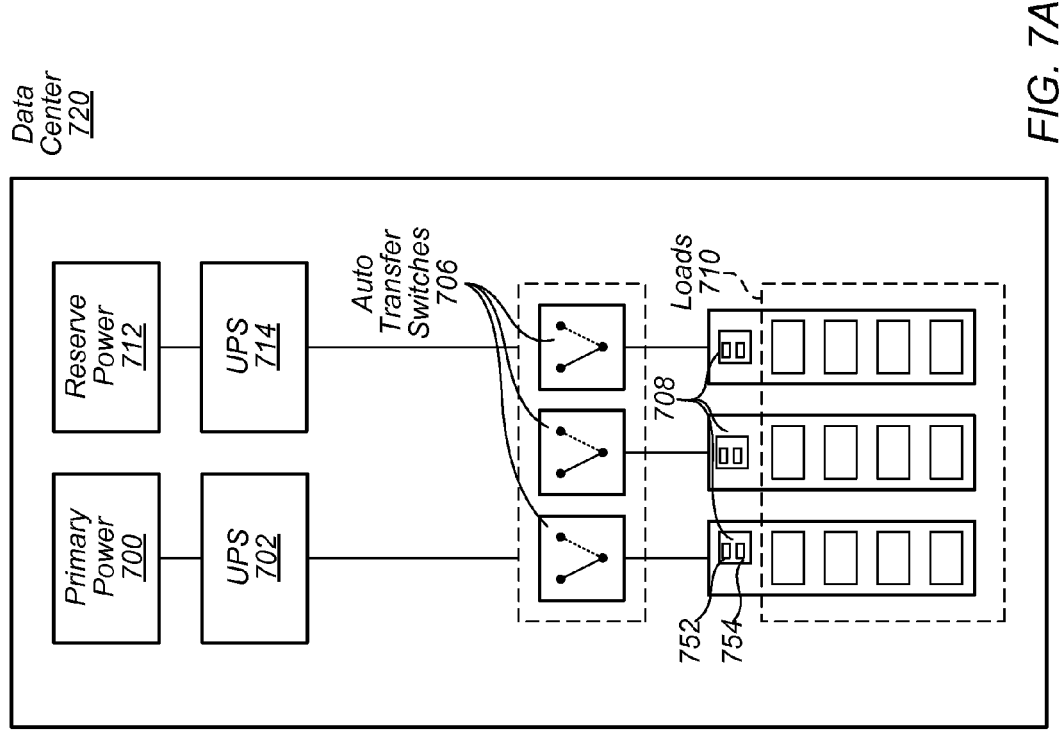
FIG. 7A illustrates a data center including automatic transfer switches, according to some embodiments.

FIG. 7A illustrates a data center comprising automatic transfer switches, according to some embodiments. Data center 720 includes a primary power source 700 and a reserve power source 712 that feed electrical power to ATSs 706. Primary power source 700 feeds electrical power via UPS 702 and secondary power source 714 feeds electrical power via UPS 714. Individual ones of rack PDUs 708 are coupled to power outputs of individual ones of ATSs 706 and distribute electrical power to individual groups of loads 710 which may include a plurality of computer systems. Individual ones of rack PDUs include surge protection circuit 752 and power filter circuit 754. ATSs 706 may be any of the ATSs described in FIGS. 1A-1D or in FIGS. 2-5. However, in some embodiments, such as illustrated in FIG. 7B some of the components illustrated in data center 720 may be eliminated from a primary or secondary power system that includes ATSs that comprise power quality conditioners and/or a battery module.

FIG. 7B illustrates alternatives to the data center configuration illustrated in FIG. 7A that may be realized when ATSs that include power quality conditioners and/or a battery module are used in a data center, according to some embodiments. For example, data center 750 does not include UPSs in power fed from primary power source 700 or from secondary power source 712. A battery module of ATSs 722, 724, 726, and 728 may provide uninterrupted power to loads 734, 742, and 744 such that a UPS is not necessary in the power systems feeding ATSs 722, 724, 726, and 728.

In another example, rack PDUs 730, 732, 738, and 740 may not include surge protectors or power filter circuits. A surge protection circuit or a power filter circuit included in ATSs 722, 724, 726, and 728 may provide surge protection or power filtration to loads 734, 742, and 744 such that additional surge protection or power filtration is not necessary in rack PDUs 730, 732, 738, and 740 fed by ATSs 722, 724, 726, and 728.

In some embodiments, an ATS, such as ATS 722 may feed electrical power to a rack PDU that feeds a full rack of computer systems, such as rack PDU 730 that feeds loads 734. In some embodiments, an ATS may be mounted separate from a rack, such as ATS 722, or an ATS may be mounted in a rack, such as ATS 724. In some embodiments, an ATS may feed electrical power to a rack PDU that feeds a half rack of computer systems, such as ATSs 726 and 728 that feed rack PDUs 738 and 734. In some embodiments, ATSs, rack PDUs, and loads may be configured in various other combinations.

In some embodiments, ATSs may be used in a power distribution system without an ATS cabinet. Also, ATSs and rack PDUs may be configured in various configuration, such as one ATS configured to support a full rack, multiple racks, or less than a half rack, etc.

Figure 8:
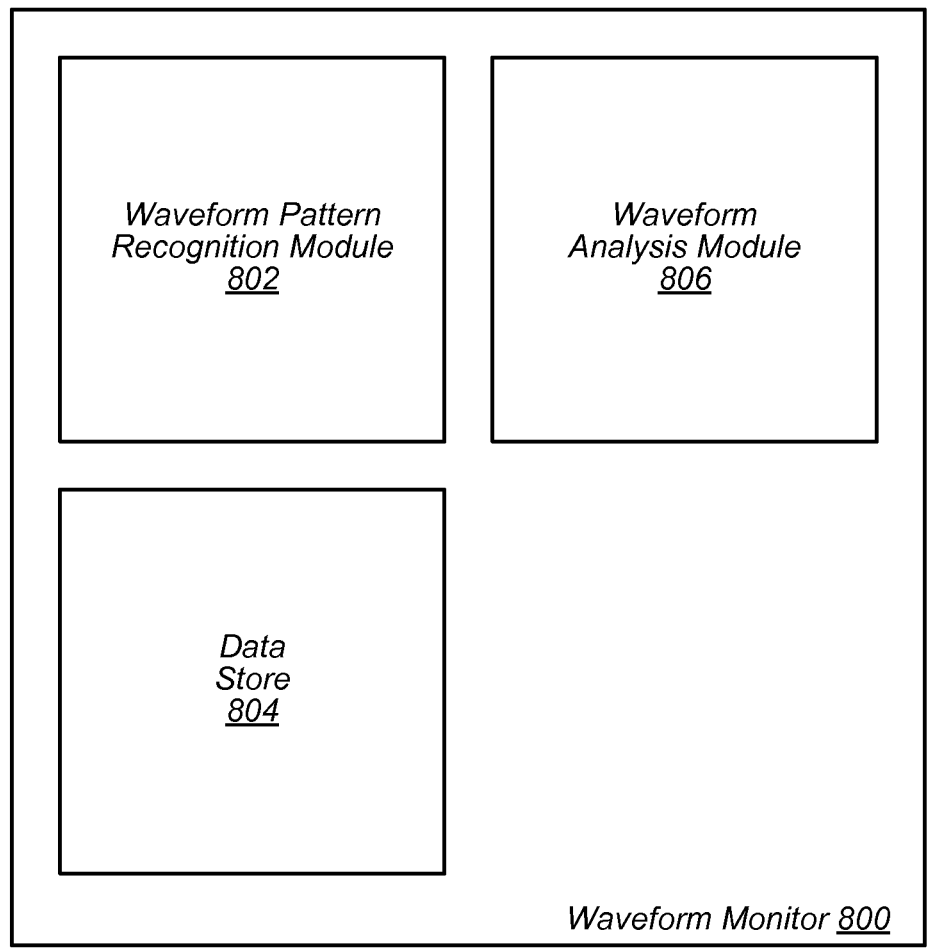
FIG. 8 illustrates a waveform monitor comprising modules, according to some embodiments.

FIG. 8 illustrates one embodiment of a waveform monitoring system having a waveform analysis module, a waveform pattern recognition module, and a data store.

In some embodiments, waveform monitoring system 800 includes one or more of a waveform pattern recognition module 802, a data store 804, and a waveform analysis module 806. Some or all of the modules included in power monitoring system 800 may be implemented by one or more components of one or more computing devices. Waveform monitoring system 800 may be included in a power monitor, such as power monitors 116 illustrated in FIGS. 1A-1D. In some embodiments, some or all of the modules in power monitoring system 800 are communicatively coupled to each other. Power monitoring system 800 may be coupled to one or more external systems through one or more communication connections, such as data interfaces 130 illustrated in FIGS. 1A-1D. In some embodiments, individual modules within waveform monitoring system 800 include individual communication connections to one or more external systems.

In some embodiments, monitoring a waveform includes monitoring the waveform for one or more waveform patterns indicating one or more particular power disruption events and, upon detecting a waveform pattern, determining that the one or more particular power disruption events may occur in a power feed.

The waveform monitoring system 800 may monitor a waveform of a power feed based on data associated with the power feed. Such data may be received at the power monitoring system 800 from one or more sensor devices (not shown). In some embodiments, sensor devices from which data is received are located external to power monitoring system 800. Data receipt may occur continuously, intermittently, periodically, or some combination thereof.

In some embodiments, data associated with a power feed is received at the power monitoring system 800 and processed by waveform analysis module 806 to monitor for one or more waveform patterns in a waveform of the power feed. A particular waveform pattern may be associated with a particular power event. For example, the presence of one waveform pattern may indicate normal variations in the power feed. Another waveform pattern may indicate, by its presence in the waveform, that the power feed is experiencing one or more particular disturbances. For example, a waveform pattern may indicate that the power feed is experiencing voltage sag. One or more disturbances may indicate that the power feed may be about to be interrupted, be sufficiently disrupted that the power feed may about to become unusable by an electrical load, etc. As a result, identifying a particular waveform pattern in a waveform of a power feed may indicate that the power feed may potentially be interrupted or otherwise unusable by a load.

Particular power disruption events may represent particular events associated with a power feed, including normal operation, certain specific disturbances in performance, power surges, brief interruptions, total loss of the power feed, etc. For example, the waveform analysis module 806 may determine, based on detection of one or more particular waveform patterns in a waveform of a power feed, that the power is unstable and may potentially fail or otherwise become unusable by a load.

In some embodiments, waveform patterns are a function of one or more characteristics of a waveform. Characteristics can include a rate of change in voltage over time, a rate of change in current over time, frequency of voltage or current, magnitude, slope of variation, some combination thereof, etc. For example, a particular waveform pattern may be identified by a reduced waveform magnitude as a variation of time, a tabled magnitude, etc. Particular waveform patterns may be associated with particular power events associated with a power feed, such that occurrence of the power event in a power feed may be anticipated by identifying an associated waveform pattern in a waveform of the power feed.

In some embodiments, power monitoring system 800 includes a waveform pattern recognition module 802 that interacts with waveform analysis module 806, data store 804 and one or more other systems to adaptively develop the ability to identify or anticipate disturbances in a power feed over time. Various machine-learning techniques may be applied, at least in part by waveform pattern recognition module 802 to develop the ability to learn to identify or anticipate various disturbances over time. Waveform pattern recognition module 802 may correlate waveform patterns detected by the waveform analysis module 806 with corresponding power events observed by the power monitoring system 800 or some external system to create associations between detected waveform patterns and observed power events for future power management. Power disruption events may be determined to be corresponding to a waveform pattern based upon a determined relationship between the power event and the waveform pattern, including time proximity of occurrences of a threshold number of the power event and the waveform pattern.

For example, waveform analysis module 806 may detect a previously-unknown waveform pattern in a waveform of a power feed and, shortly thereafter, detect that the power feed is interrupted. The waveform analysis module 806 may respond to detecting an unknown waveform pattern by storing the unknown waveform pattern. The waveform pattern recognition module 802 may respond to one or more occurrences of the unknown waveform pattern and the power interruption event by associating the unknown waveform pattern with the power interruption event such that, upon detecting the waveform pattern in the future, the waveform analysis module 806 may determine that the power interruption event may potentially occur.

In some embodiments, upon determining an association of a waveform pattern with a power event, a portion of power monitoring system 800 may establish pattern identification data associated with the waveform pattern. Such establishment may be performed by one or more modules in power monitoring system 800. Pattern identification data including information identifying associations between known power events and known waveform patterns may be utilized by the waveform analysis module 806 to identify waveform patterns and determine the potential occurrence of power events in a power feed. In some embodiments, the information may include characteristic information associated with a known waveform pattern that identifies the associated one or more power events, such that the waveform analysis module 806 compares a monitored waveform with characteristics of one or more known waveforms and, upon determining a correlation between the monitored waveform and a known waveform pattern based on the characteristics, determines the potential occurrence of an associated power event. In some embodiments, the information may include one or more algorithms utilized by the waveform analysis module to process a waveform, such that, if a certain result of processing the waveform with the algorithm occurs, the potential occurrence or non-occurrence of a particular associated power event is determined.

In some embodiments, data store 804 may store information related to various modules in power monitoring system 800. For example, data store 804 may store associations between known waveform patterns and known power events. Data store 804 may store pattern identification data associated with known waveform patterns. In some embodiments, information stored at data store 804 is received from an external source. For example, data store 804 may store received predetermined data supplied by a user to power monitoring system through a user interface, or the like.

Figure 9:
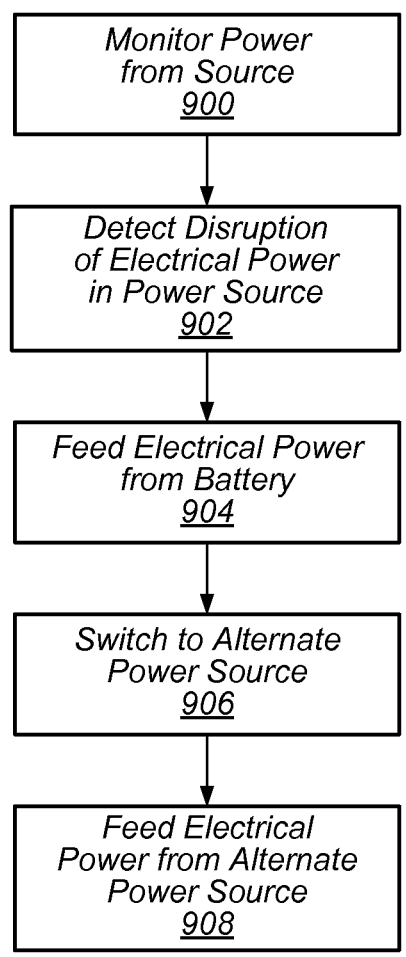
FIG. 9 illustrates switching power sources in response to a disruption of electrical power, according to some embodiments.

FIG. 9 illustrates sensing a disruption in electrical power received by an ATS and switching to receive power from a secondary power source, according to some embodiments.

At 900, power from a power source is monitored for a disruption in electrical power received from the power source. For example, a power monitor of an ATS may monitor electrical power received via a primary power input of the ATS for a disruption in the electrical power. In some embodiments, waveform monitoring may be used to detect waveform patterns indicating a potential power disruption event in electrical power being received from a power source. In some embodiments, electrical power received via a secondary power input of an ATS may be monitored for a disruption in the electrical power being received via the secondary power input.

At 902, a disruption is detected in electrical power being monitored. A disruption may be a voltage amplitude in incoming electrical power that is below a threshold amplitude. In some embodiments, a disruption of electrical power may be an identified waveform that matches a waveform pattern indicating a potential power disruption event. In some embodiments, a disruption of electrical power may be a complete loss of electrical flow. In response to a power disruption event, a power monitor of an ATS may output a signal to a switch of the ATS to switch to a secondary power source. In some embodiments, a power monitor of an ATS may refrain from outputting a signal to a switch of the ATS for a predetermined amount of time, but may output a preliminary signal to a battery module of an ATS.

At 904, electrical power is fed from a battery module of an ATS to a power output of an ATS such that uninterrupted electrical power is fed to the power output of the ATS. For example, a battery module of an ATS may receive the preliminary signal from the power monitor of the ATS and feed electrical power to the output of the ATS in response to receiving the preliminary signal. In some embodiments, a power monitor may output a signal to a switch of an ATS and a battery module of an ATS without waiting a predetermined amount of time. In response to receiving the signal from the power monitor of an ATS, a battery module of an ATS may feed electrical power to an output of the ATS while the switch of the ATS is switching to feed electrical power from a secondary power input of the ATS instead of the primary power input of the ATS.

At 906, a switch of the ATS switches to feed electrical power from a secondary power input of the ATS instead of the primary power input of the ATS. The switch may switch from the primary power input to the secondary power input in response to receiving the signal from the power monitor of the ATS. In some embodiments, 904 and 906 may be performed concurrently.

At 908, electrical power is fed to the power output of the ATS from an alternate power source electrically coupled to a secondary power input of an ATS. This may take place after the switch of the ATS has completed switching in 906. In some embodiments, after sensing that electrical power is being fed from an alternative power source, a power monitor of an ATS may send a follow up signal to a battery module of an ATS to stop feeding electrical power to the power output of the ATS.

Figure 10:
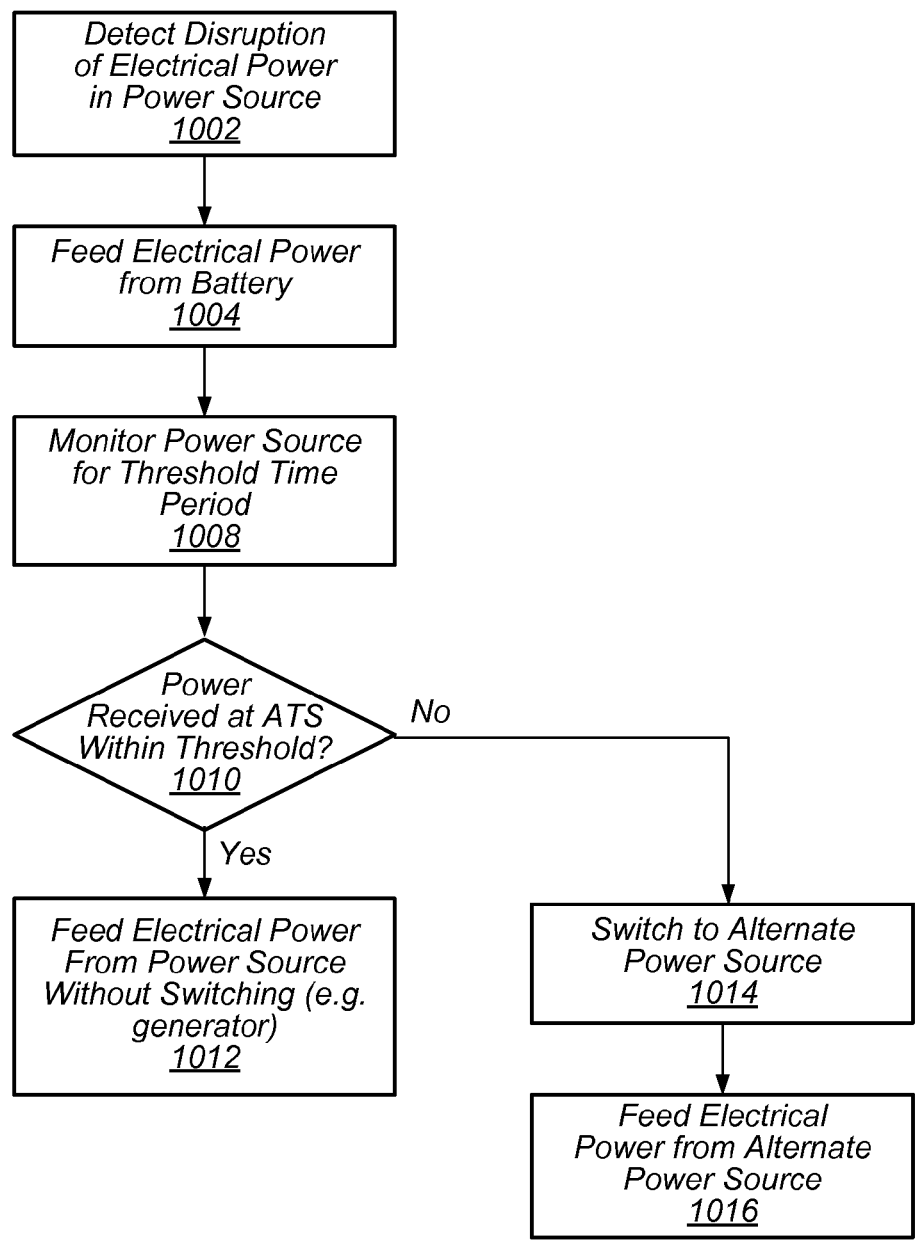
FIG. 10 illustrates switching power sources in response to a disruption of electrical power, according to some embodiments.

FIG. 10 illustrates sensing a disruption in electrical power received by an ATS and switching to receive power from a secondary power source after a threshold delay, according to some embodiments.

At 1002, a disruption of electrical power is detected in a power source feeding a power input to an ATS. In response to detecting the disruption of electrical power being received from a power source, a power monitor of an ATS may output a preliminary signal, but refrain from outputting a signal to a switch of the ATS for a threshold amount of time.

At 1004, in response to the preliminary signal a battery module of an ATS may feed electrical power to a power output of the ATS. In some embodiments, a battery module may have sufficient battery capacity to feed electrical power to the power output of the ATS that is electrically coupled to computer systems in a data center for a time period sufficient for a generator in a power system electrically coupled to the ATS to transition from an idle or off state to a power generating state (e.g. may provide electrical power for 45 seconds or more). In some embodiments, a generator in a power system may take various amounts of time to transition from an idle or off state to a power generating state. A battery module of an ATS may have battery capacity configured to feed electrical power to the power output of the ATS that is based on the particular characteristics of a generator in a power system feeding the ATS.

At 1008, the power monitor of the ATS continues to monitor the primary power input of the ATS during the threshold amount of time to determine if electrical power has been restored in the primary power source. At 1010, the power monitor of the ATS determines if electrical power is received at the primary power input of the ATS within the threshold amount of time.

At 1012, in response to determining that power is being received at the primary power input of the ATS within the threshold amount of time, the power monitor resets and does not send the signal to the switch of the ATS to switch to feed electrical power from the secondary power input of the ATS. The result of not switching to feed from the secondary power input of the ATS is to continue to feed electrical power from the primary power source in which electrical power has been restored. In some embodiments, in response to sensing that electrical power has been restored to the primary power input, the power monitor of the ATS may send a follow up signal to a battery module of the ATS to stop the battery module from feeding electrical power to the power output of the ATS.

At 1014, in response to determining at 1010 that electrical power has not been restored to the primary power input of the ATS within the threshold amount of time, the power monitor of the ATS outputs the signal to the switch of the ATS. In response to the signal, the switch electrically couples the secondary power input of the ATS to the power output of the ATS.

At 1016, after the switch has coupled the secondary power input of the ATS to the power output of the ATS electrical power is fed to the power output of the ATS from an alternate power source electrically coupled to the secondary power input of the ATS. In some embodiments, in response to sensing electrical power is being fed from a secondary power source, the power monitor of an ATS may output a follow up signal to a battery module of the ATS to stop feeding electrical power to the power output of the ATS.

Figure 11:
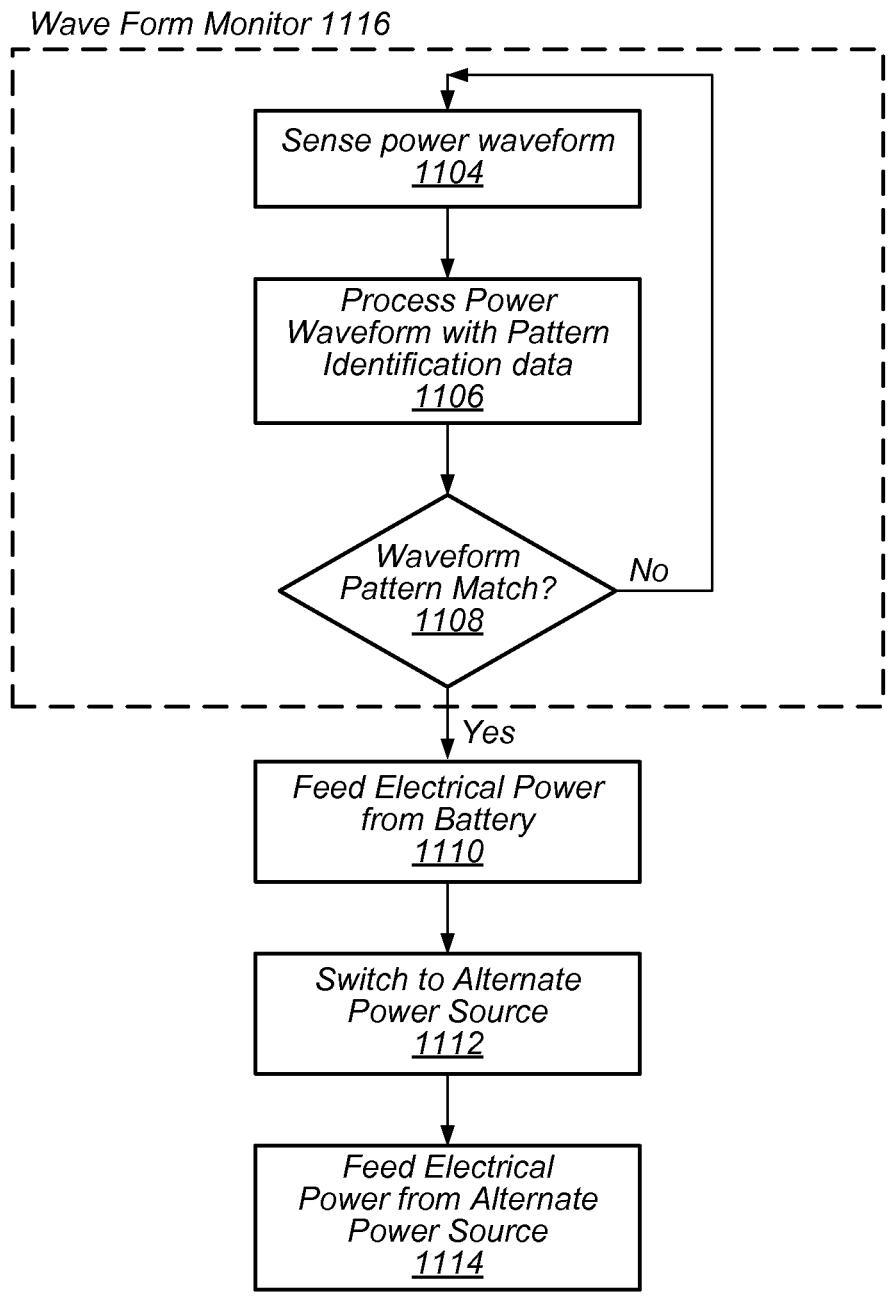
FIG. 11 illustrates switching power sources in response to a disruption of electrical power, according to some embodiments.

FIG. 11 illustrates sensing a disruption in electrical power received by an ATS and switching to receive power from a secondary power source with an ATS that includes a waveform monitor, according to some embodiments.

1104, 1106, and 1108 may be performed by a waveform monitor 1116 that is included in a power monitor, such as waveform monitor 112 included in power monitor 116 illustrated in FIGS. 1A-1D.

At 1104 a waveform is sensed in electrical power received from a primary power input or a secondary power input of an ATS. In some embodiments one or more sensors may sense power waveforms in a primary or secondary power input of an ATS. In some embodiments, a same set of sensors may be used by a power monitor and waveform monitor included in a power monitor to sense waveforms in a primary or secondary power input to an ATS.

At 1106, sensed waveform patterns are processed with waveform pattern identification data stored in a data store accessible to a waveform monitor. For example, a waveform analysis module such as waveform analysis module 806 illustrated in FIG. 8 may compare waveforms stored in a data store to waveform patterns included in electrical power being fed to the ATS via a primary power input or a secondary power input.

At 1108, it is determined if current waveforms being detected in incoming power received via a primary power input or a secondary power input match waveforms stored in a data store that indicate potential power disruption events. If no waveforms matching potential power disruption events are currently being detected, the process returns to 1104 and repeats.

At 1110, in response to determining a currently detected waveform matches a stored waveform indicating a potential power disruption event, a power monitor of an ATS (that includes the waveform monitor) outputs a signal to a battery module of the ATS to feed electrical power to the output of the ATS and outputs a signal to a switch of the ATS to switch to electrically couple the power output of the ATS to a secondary power source instead of the primary power source.

At 1112 the switch switches to electrically couple the output of the ATS to the secondary power input instead of the primary power input. A battery module of the ATS provides electrical power to the power output of the ATS while the switch switches from the primary power input to the secondary power input. In some embodiments, 1110 and 1112 may be performed concurrently.

At 1114, electrical power is fed to the power output of the ATS from an alternate power source electrically coupled to a secondary power input of an ATS. 1114 may take place after the switch of the ATS has completed switching in 1112. In some embodiments, after sensing that electrical power is being fed from an alternative power source, a power monitor of an ATS may send a follow up signal to a battery module of an ATS to stop feeding electrical power to the power output of the ATS.

Figure 12:
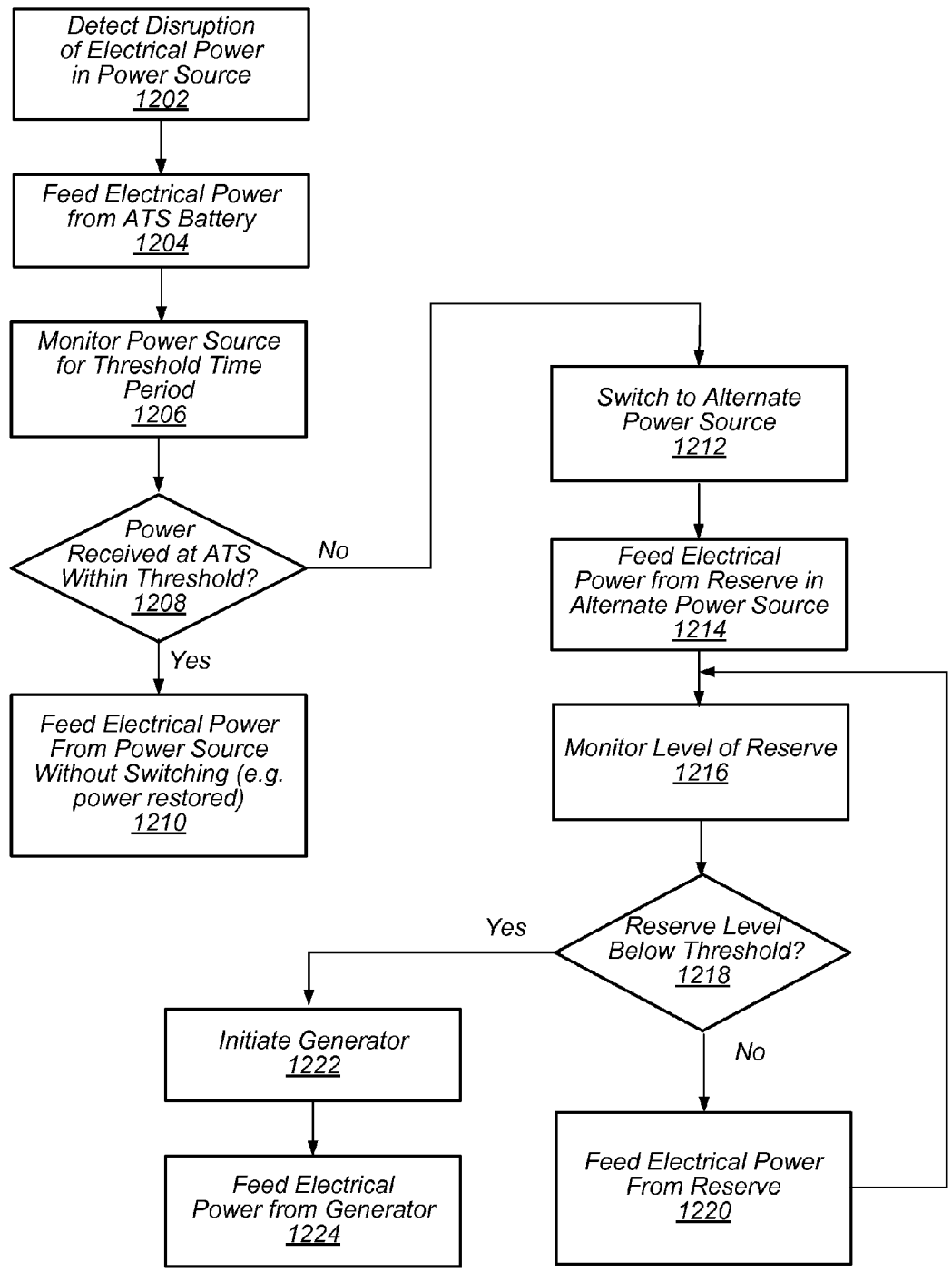
FIG. 12 illustrates switching power sources in response to a disruption of electrical power, according to some embodiments.

FIG. 12 illustrates feeding electrical power from a battery module of an ATS or from a power reserve in an alternate power source, according to some embodiments.

At 1202, a disruption of electrical power is detected in a power source feeding a power input to an ATS. In response to detecting the disruption of electrical power being received from a power source, a power monitor of an ATS may output a preliminary signal, but refrain from outputting a signal to a switch of the ATS for a threshold amount of time.

At 1204, in response to the preliminary signal a battery module of an ATS may feed electrical power to a power output of the ATS. In some embodiments, a battery module may have sufficient battery capacity to feed electrical power to the power output of the ATS that is electrically coupled to computer systems in a data center for a time period. In some embodiments, a battery module in an ATS may have sufficient capacity to provide uninterrupted electrical power to an output of the ATS electrically coupled to a group of computer systems for up to 45 seconds. In some embodiments, a battery module of an ATS may have sufficient capacity to provide uninterrupted electrical power to an output of the ATS electrically coupled to a group of computer systems for more or less time.

At 1206, the power monitor of the ATS continues to monitor the primary power input of the ATS during the threshold amount of time to determine if electrical power has been restored in the primary power source. At 1208, the power monitor of the ATS determines if electrical power is received at the primary power input of the ATS within the threshold amount of time.

At 1210, in response to determining that power is being received at the primary power input of the ATS within the threshold amount of time, the power monitor resets and does not send the signal to the switch of the ATS to switch to feed electrical power from the secondary power input of the ATS. The result of not switching to feed from the secondary power input of the ATS is to continue to feed electrical power from the primary power source in which electrical power has been restored. In some embodiments, in response to sensing that electrical power has been restored to the primary power input, the power monitor of the ATS may send a follow up signal to a battery module of the ATS to stop the battery module from feeding electrical power to the power output of the ATS.

At 1212, in response to determining at 1208 that electrical power has not been restored to the primary power input of the ATS within the threshold amount of time, the power monitor of the ATS outputs the signal to the switch of the ATS. In response to the signal, the switch electrically couples the secondary power input of the ATS to the power output of the ATS.

At 1214 electrical power is fed from a reserve power store of the alternate power source that is electrically coupled to the secondary power input of the ATS. In some embodiments, the reserve power store may be a battery in an alternate power source. In some embodiments, the reserve power store may be a UPS of the alternate power source. A reserve power store may be any device configured to store electrical power such as a flywheel, a battery, or other like energy storage devices.

At 1216 a controller in the alternate power source monitors the level of power remaining in the reserve power store. In some embodiments, the controller in the alternate power source may monitor the level of power remaining in the reserve power store by monitoring an amount of time that has elapsed since electrical power began to be fed from the reserve power store. At 1218, the controller in the alternate power source determines if the level of power remaining in the reserve power store is below a threshold level of stored power. At 1220, in response to determining at 1218 that the level of power remaining in the reserve power store is not below a threshold level of power remaining, electrical power continues to be fed from the reserve power store in the alternate power system. The process then reverts back to 1216 and the controller in the alternate power source continues to monitor the level of power remaining in the reserve power store.

At 1222, in response to the controller in the alternate power source determining at 1218 that the level of power remaining the reserve power store in the alternate power source is below a threshold level of power remaining, the controller initiates a generator to provide electrical power to the group of computer systems that receive electrical power from the ATS. In some embodiments, a power system of the alternate power source may comprise a generator and the generator of the alternate power source may be initiated in response to the level of power remaining in the reserve power source falling below a threshold. In some embodiments, the power source electrically coupled to the primary power input of the ATS may comprise a generator, and the power monitor of the ATS may receive a command via a data interface to switch back to the primary power input after a generator in the primary power input has been transitioned from an off or idle state to a power generating state. In some embodiments the power source electrically coupled to the primary power input of the ATS and the alternate power source electrically coupled to the secondary power input of the ATS may comprise generators. In some embodiments, the power monitor of the ATS may sense that electrical power is being received at the primary power input of the ATS after a generator in the primary power system has been initiated and in response output a signal to the switch of the ATS to switch to electrically couple the output of the ATS to the primary power input.

At 1224, electrical power is fed from the generator to the power output of the ATS electrically coupled to a group of computer systems.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
a plurality of rack mounted computers; and
an electrical power distribution system comprising:
   a plurality of automatic transfer switches, wherein individual ones of the automatic transfer switches comprise:
      a primary power input, a secondary power input, and a power output, wherein the power output is electrically coupled to a group of the plurality of rack mounted computers of the data center;
      a power monitor configured to:
         monitor electrical power received via the primary power input, and
         in response to a disruption in electrical power received at the primary power input, output a signal;
      a switch configured to:
         electrically couple the primary power input to the power output or to electrically couple the secondary power input to the power output, such that electrical power received via the primary power input or the secondary power input is fed to the power output; and
         in response to the signal from the power monitor, switch to electrically couple the power output to the secondary power input instead of the primary power input;
      one or more power quality conditioners configured to condition electrical power output from the power output; and
      a battery module configured to, in response to the signal from the power monitor, feed uninterrupted electrical power to the power output; and
   a plurality of rack mounted power distribution units, wherein individual ones of the rack mounted power distribution units are configured to distribute electrical power from a power output of an individual automatic transfer switch to a group of rack mounted computers;
   wherein, the one or more power quality conditioners of the individual automatic transfer switches are configured to condition electrical power fed to the individual ones of the rack mounted power distribution units such that additional electrical current or voltage filtration is not included in the individual ones of the rack mounted power distribution units.

2. The data center of claim 1, wherein the one or more power quality conditioners of a particular automatic transfer switch of the plurality of automatic transfer switches are further configured to:
  isolate electrical power disturbances associated with a particular group of rack mounted computers electrically coupled to the particular automatic transfer switch such that electrical power disturbances associated with the group do not propagate to one or more other groups of rack mounted computers that are fed electrical power via another automatic transfer switch of the plurality of automatic transfer switches, wherein the particular automatic transfer switch and the other automatic transfer switch receive electrical power from a common power source in the power distribution system.

3. The data center of claim 1, wherein the battery module is configured to, in response to receiving the signal from the power monitor, supply uninterrupted electrical power to the power output while the switch is switching from being electrically coupled to the primary power input to being electrically coupled to the secondary power input.

4. The data center of claim 1, wherein the battery module is configured to, in response to the signal from the power monitor, supply uninterrupted electrical power to the power output while a generator in the electrical power distribution system is transitioned from an idle or off state to a power generating state.

5. The data center of claim 1, wherein the electrical power distribution system comprises a primary power system that comprises an uninterruptible power supply (UPS), wherein the primary power system is configured to feed electrical power to the primary power input of individual automatic transfer switches via the UPS, wherein the UPS is configured to:
  operate in a bypass mode, wherein in the bypass mode electrical power bypasses one or more components of the UPS; and
  operate in an active mode, in response to the disruption of electrical power in the primary power system, wherein in the active mode electrical power is fed from a battery of the UPS;
wherein, the battery module of the automatic transfer switch is configured to provide an uninterrupted supply of electrical power to the power output while the UPS is transitioning from the bypass mode to the active mode.

6. The data center of claim 1, wherein the electrical power distribution system comprises a primary power system that feeds electrical power to the primary power input of individual automatic transfer switches, wherein the primary power system does not include an uninterruptible power supply (UPS); and
  wherein, the power monitor is further configured to:
    output a preliminary signal in response to the disruption in electrical power received at the primary power input;
    delay outputting the signal until a threshold amount of time has passed since the power disruption event; and
    output the signal, in response to the threshold amount of time passing without electrical power being received at the primary power input;
  wherein, the battery module of the automatic transfer switch is configured to supply electrical power to the power output of the automatic transfer switch during the threshold amount of time; and
  wherein, the switch continues to electrically couple the primary power input to the power output during the threshold amount of time until the signal is received.

7. The data center of claim 1, wherein the one or more rack mounted computers comprise one or more power supplies configured to supply electrical power to the one or more rack mounted computer systems for a period of time less than a period of time required for the switch of the automatic transfer switch to switch to electrically couple the power output to the secondary power input instead of the primary power input;
  wherein, the battery module is configured to supply uninterrupted electrical power to the one or more power supplies such that the one or more rack mounted computers receive uninterrupted electrical power while the switch switches to electrically couple the power output to the secondary power input instead of the primary power input.

8. An automatic transfer switch, comprising:
  a primary power input;
  a secondary power input;
  a power output;
  a power monitor configured to:
    monitor electrical power received via the primary power input, and
    in response to a disruption in the electrical power received at the primary power input:
      delay outputting a signal until a threshold amount of time has passed since the power disruption event; and
      output the signal in response to the threshold amount of time passing without electrical power being received at the primary power input;
  a switch configured to:
    electrically couple the primary power input to the power output or to electrically couple the secondary power input to the power output, such that electrical power received via the primary power input or the secondary power input is fed to the power output; and
    in response to the signal from the power monitor, switch to electrically couple the power output to the secondary power input instead of the primary power input; and
  one or more power quality conditioners configured to condition electrical power output from the power output.

9. The automatic transfer switch of claim 8, further comprising:
  a battery module configured to feed electrical power to the power output during the threshold amount of time.

10. The automatic transfer switch of claim 9, wherein the battery module is configured to supply uninterrupted electrical power to the power output for at least 12 milliseconds.

11. The automatic transfer switch of claim 9, wherein the battery module is configured to supply uninterrupted electrical power to the power output for at least 40 seconds.

12. The automatic transfer switch of claim 9, wherein the battery module comprises an inverter configured to feed alternating current (AC) electrical power to the power output.

13. The automatic transfer switch of claim 8, wherein the automatic transfer switch further comprises an enclosure configured to:

mount into a slot of a plurality of slots of a cabinet, wherein individual ones of the slots of the cabinet are configured to accept individual automatic transfer switches; wherein the switch and the one or more power quality conditioners are enclosed within the enclosure.

14. The automatic transfer switch of claim 8, wherein the one or more power quality conditioners comprise:

a filter circuit configured to filter harmonic currents or harmonic voltages in the electrical power, or a surge protector circuit configured to dissipate current or voltage surges in the electrical power.

15. The automatic transfer switch of claim 8, further comprising a data interface configured to provide data from the power monitor to one or more remote computer systems via a network.

16. The automatic transfer switch of claim 8, further comprising a data interface configured to receive one or more switching commands from one or more remote computer systems via a network;

wherein, the power monitor is further configured to output the signal in response to receiving a switching command from the one or more remote computer systems.

17. The automatic transfer switch of claim 8, wherein the power monitor further comprises a waveform monitor, wherein the waveform monitor is configured to:

detect one or more waveforms in the electrical power received via the primary power input or secondary power input; and compare the one or more detected waveforms to one or more stored waveforms, wherein the one or more stored waveforms indicate a power disruption event.

18. A method of switching power sources of an automatic transfer switch, wherein the method comprises:

detecting a disruption in electrical power received from a primary power source including comparing a currently received waveform pattern representation of the primary power source to a plurality of stored waveform pattern representations to detect the disruption, each stored waveform representation associated with a corresponding power disruption event, wherein the electrical power from the primary power source is received at a primary power input of the automatic transfer switch and fed to a power output of the automatic transfer switch;

in response to detecting the disruption, switching a switch of the automatic transfer switch to receive electrical power from a secondary power source via a secondary power input of the automatic transfer switch, wherein the electrical power is fed from the secondary power input to the power output; and while the switch is switching from receiving electrical power from the primary power source to receiving electrical power from the secondary power source, feeding electrical power to the power output from a battery module of the automatic transfer switch such that an uninterrupted supply of electrical power is fed to the power output while the switch switches from receiving electrical power from the primary power source to receiving electrical power from the secondary power source.

19. The method of claim 18, further comprising:

in response to detecting the disruption, transitioning a generator of the primary power source or the secondary power source from an off or idle state to a generating state; and feeding uninterrupted electrical power from the battery module to the power output while the generator is transitioned from the off or idle state to the generating state.

20. The method of claim 19, wherein each stored waveform pattern representation includes a corresponding rate of change of voltage or current over time, and wherein comparing includes comparing the rate of change of voltage or current over time for the primary power source to the plurality of stored waveform pattern representations.

* * * * *